US009241163B2

(12) United States Patent
Zhou et al.

(10) Patent No.: US 9,241,163 B2
(45) Date of Patent: Jan. 19, 2016

(54) VC-2 DECODING USING PARALLEL DECODING PATHS

(71) Applicant: Intersil Americas LLC, Milpitas, CA (US)

(72) Inventors: Caizhang Zhou, Fremont, CA (US); Ting-Chung Chen, San Jose, CA (US); Chia-Chun Huang, San Jose, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 448 days.

(21) Appl. No.: 13/851,821

(22) Filed: Mar. 27, 2013

(65) Prior Publication Data

US 2014/0269904 A1    Sep. 18, 2014

Related U.S. Application Data

(60) Provisional application No. 61/798,790, filed on Mar. 15, 2013.

(51) Int. Cl.

| H04N 7/12 | (2006.01) |
| H04N 11/02 | (2006.01) |
| H04N 11/04 | (2006.01) |
| H04N 19/126 | (2014.01) |
| H04N 19/196 | (2014.01) |
| H04N 19/157 | (2014.01) |
| H04N 19/174 | (2014.01) |
| H04N 19/42 | (2014.01) |

(52) U.S. Cl.
CPC ........... *H04N 19/126* (2014.11); *H04N 19/157* (2014.11); *H04N 19/174* (2014.11); *H04N 19/196* (2014.11); *H04N 19/42* (2014.11)

(58) Field of Classification Search
None
See application file for complete search history.

(56) References Cited

U.S. PATENT DOCUMENTS

| 5,982,459 A * | 11/1999 | Fandrianto et al. ......... 348/425.3 |
| 6,859,563 B2 * | 2/2005 | Schwartz et al. ............. 382/247 |
| 6,931,061 B2 * | 8/2005 | Youn et al. ............... 375/240.03 |

(Continued)

OTHER PUBLICATIONS

Huang et al., "Analysis and VLSI Architecture for 1-D and 2-D Discrete Wavelet Transform", IEEE Transactions on Signal Processing, vol. 53, No. 4, Apr. 2005, pp. 1575-1586.

(Continued)

*Primary Examiner* — Joseph Ustaris
*Assistant Examiner* — Talha Nawaz
(74) *Attorney, Agent, or Firm* — Vierra Magen Marcus LLP

(57) ABSTRACT

Methods, devices and systems that perform VC-2 decoding are disclosed. In an embodiment, a VC-2 decoder includes three parallel data paths including top-band, current-band and bottom-band data paths. The top-band data path performs variable length decoding (VLD), inverse-quantization (IQ) and inverse-DC-prediction (IDCP) processing of a top compressed data-band. The current-band data path performs VLD, IQ and IDCP processing of a current compressed data-band. The bottom-band data path performs VLD, IQ and IDCP processing of a bottom compressed data-band. Additionally, the decoder includes a three-level inverse discrete wavelet transform (IDWT) module to perform IDWT processing to synthesize decoded source pixel values in dependence on partially-decompressed top, current and bottom data-bands produced using the three parallel data paths. The decoder also includes a slice-bytes equalizer, a bit-stream first-in-first-out (FIFO), a scan conversion FIFO, and a module that inserts horizontal and vertical blanking periods into data received from the scan conversion FIFO.

21 Claims, 22 Drawing Sheets

(3-level IDWT process that synthesizes the 10 bands into the source)

(56) References Cited

U.S. PATENT DOCUMENTS

| | | | |
|---|---|---|---|
| 6,978,048 B1* | 12/2005 | Higginbottom et al. | 382/240 |
| 7,062,101 B2* | 6/2006 | Schwartz | 382/248 |
| 2004/0080626 A1* | 4/2004 | Fukuzawa | 348/220.1 |
| 2004/0228537 A1* | 11/2004 | Yeung et al. | 382/239 |
| 2005/0141776 A1* | 6/2005 | Dang | 382/250 |
| 2006/0071825 A1* | 4/2006 | Demos | 341/50 |
| 2006/0227877 A1* | 10/2006 | Kadowaki | 375/240.24 |
| 2007/0070080 A1* | 3/2007 | Graham et al. | 345/589 |
| 2007/0156801 A1* | 7/2007 | Guevorkian | 708/400 |
| 2008/0019398 A1* | 1/2008 | Genossar et al. | 370/498 |
| 2008/0063082 A1* | 3/2008 | Watanabe et al. | 375/240.23 |
| 2009/0125538 A1* | 5/2009 | Rosenzweig et al. | 707/101 |
| 2010/0046845 A1* | 2/2010 | Wedi et al. | 382/233 |
| 2010/0091861 A1* | 4/2010 | Sung | 375/240.16 |
| 2010/0254620 A1* | 10/2010 | Iwahashi et al. | 382/233 |
| 2011/0145549 A1* | 6/2011 | Suk et al. | 712/208 |
| 2011/0200115 A1* | 8/2011 | Hayashi et al. | 375/240.24 |
| 2011/0211036 A1* | 9/2011 | Tran | 348/14.08 |
| 2012/0099657 A1* | 4/2012 | Tanaka et al. | 375/240.23 |
| 2013/0058412 A1* | 3/2013 | Chen et al. | 375/240.13 |
| 2014/0003531 A1* | 1/2014 | Coban et al. | 375/240.24 |
| 2014/0247875 A1* | 9/2014 | Hattori et al. | 375/240.12 |

OTHER PUBLICATIONS

Mohanty et al., "Area- and Power-Efficient Architecture for High-Throughput Implementation of Lifting 2-DDWT", IEEE Transactions on Circuits and Systems—II: Express Briefs, vol. 59, No. 7, Jul. 2012, pp. 434-438.

The Society of Motion Picture and Television Engineers, "SMPTE Recommended Practice—VC-2 Level 65 Compression of High Definition Video Sources for Use with a Standard Definition Infrastructure", SMPTE RP 2047-3:2011, May 2011.

The Society of Motion Picture and Television Engineers, "for Television—SDTV1 Digital Signal/Data—Serial Digital Interface", SMPTE 259M-2008, Jan. 2008.

The Society of Motion Picture and Television Engineers, "for Television—1920 × 1080 Image Sample Structure, Digital Representation and Digital Timing Reference Sequences for Multiple Picture Rates", SMPTE 274M-2008, Jan. 2008.

Salehi et al., "A Block-Based 2D Discrete Wavelet Transform Structure With New Scan Method for Overlapped Sections", Biomedical Engineering (MECBME), 2011 1st Middle East Conference, Feb. 2011.

The Society of Motion Picture and Television Engineers, "SMPTE Standard—VC-2 Video Compression", SMPTE ST 2042-1:2009, Nov. 2009.

The Society of Motion Picture and Television Engineers, "SMPTE Standard—Carriage of VC-2 Compressed Video over HD-SDI", SMPTE ST 2047-2:2010, Jan. 2010.

The Society of Motion Picture and Television Engineers, "SMPTE Standard—Carriage of Level 65 VC-2 Compressed Video Over the SDTV SDI", SMPTE ST 2047-4:2011, Jun. 2011.

* cited by examiner

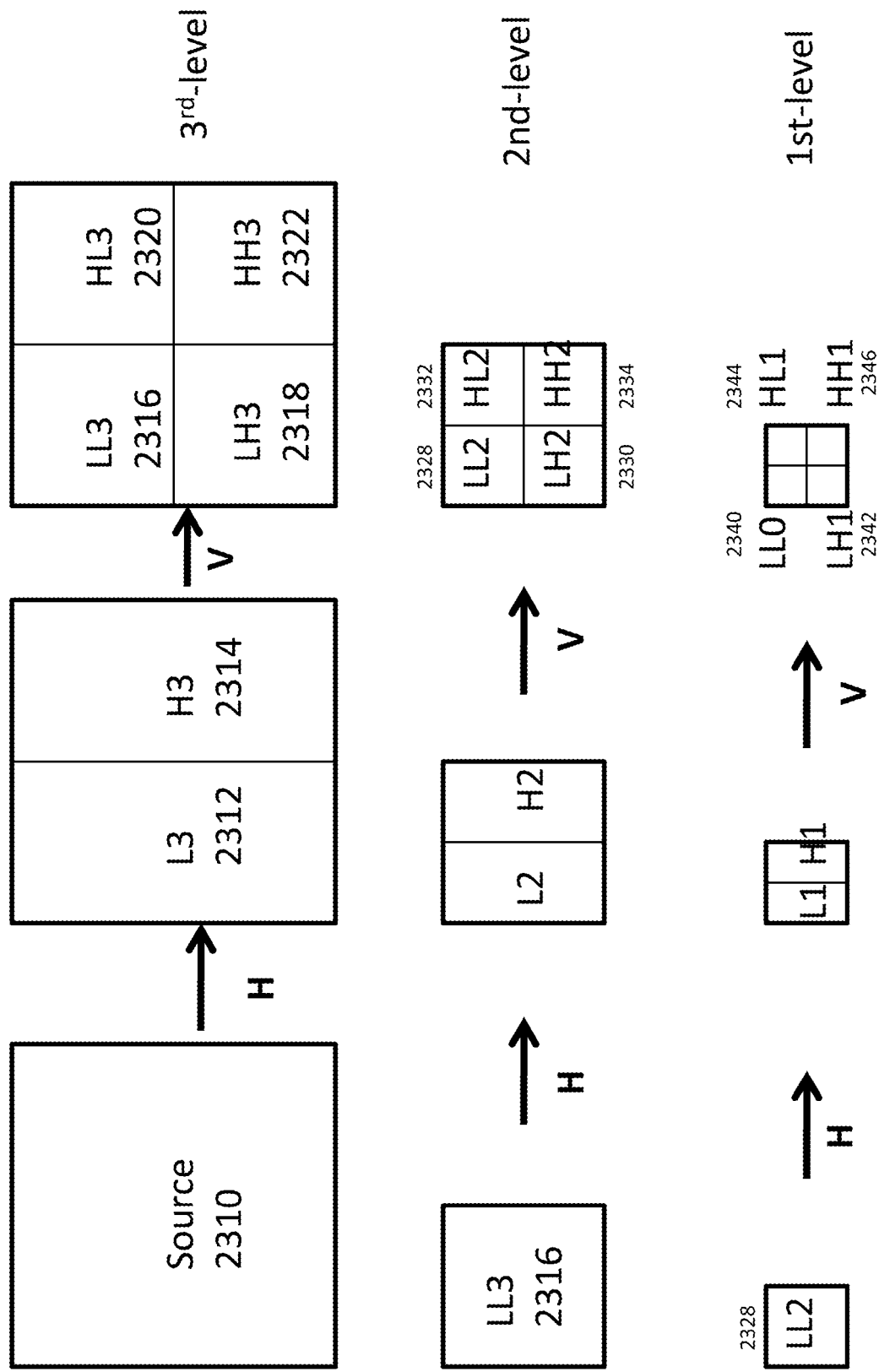
Fig. 2D (3-level DWT process that decomposes the source into 10 bands)

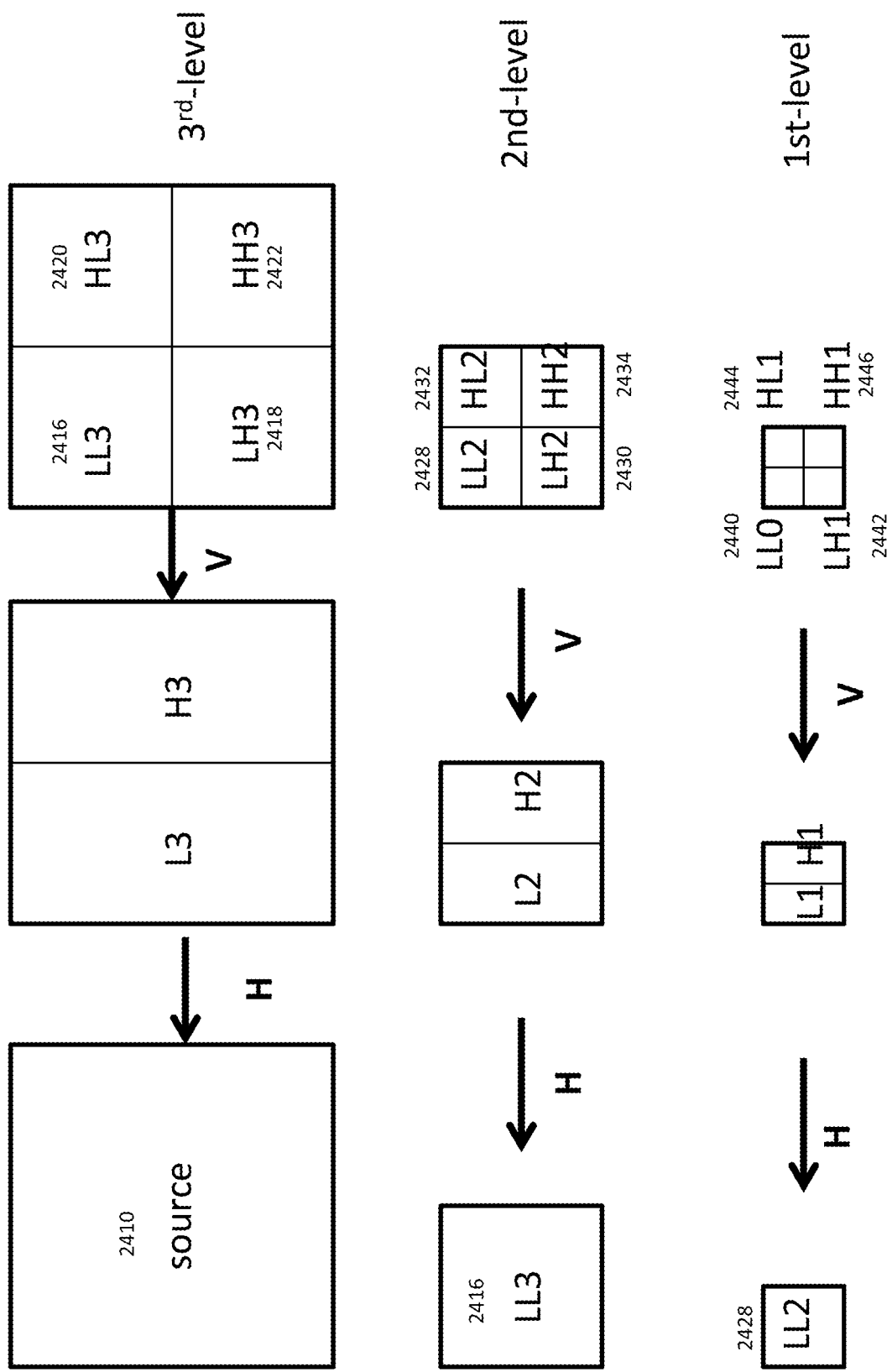
Fig. 2E (3-level IDWT process that synthesizes the 10 bands into the source)

T – top band
C – current band
B – bottom band

| | 440 | 445 | 450 | 455 | 460 | 465 | 470 |
|---|---|---|---|---|---|---|---|
| 410 | -6,-12 T | -6,0 T | -6,2 T | -6,1 T | -6,3 T | -6,16 T | -6,18 T |
| 415 | 0,-12 CL | 0,0 C | 0,2 C | 0,1 C | 0,3 C | 0,16 CR | 0,18 CR |
| 420 | 1,-12 CL | 1,0 C | 1,2 C | 1,1 C | 1,3 C | 1,16 CR | 1,18 CR |
| 425 | 8,-12 B | 8,0 B | 8,2 B | 8,1 B | 8,3 B | 8,16 B | 8,18 B |
| 430 | 9,-12 B | 9,0 B | 9,2 B | 9,1 B | 9,3 B | 9,16 B | 9,18 B |

T – top band
C – current band
B – bottom band

| | 810 | 815 | 820 | 825 | 830 | 835 | 840 |
|---|---|---|---|---|---|---|---|
| 875 | -4,10 | | | | | | 10,10 |
| 870 | -4,8 | CR1 | | CR1 | | BR1 | 10,8 |
| 865 | -4,6 | | | | | | 10,6 |
| 860 | -4,4 | C1 | | C1 | | B1 | 10,4 |
| 855 | -4,2 | | | | | | 10,2 |
| 850 | -4,0 | C1 | | C1 | | B1 | 10,0 |
| 845 | -4,-4 T | 0,-4 C | 2,-4 C | 1,-4 C | 3,-4 C | 8,-4 B | 10,-4 B |

Each slice contains 8x16=128 pixels, but only a portion is stored at the top, Bottom, and right slices.
Total savings: (9-3.3)/9 = 63% or 93,388 of the 9-slice registers.

| 1310 | 1320 | 1330 |
| --- | --- | --- |
| 28/128 | 28/128 | 3/128 |
| 1340 | 1350 | 1360 |
| 128/128 | 128/128 | 14/128 |
| 1370 | 1380 | 1390 |
| 44/128 | 44/128 | 6/128 |

Fig. 13A

| 2 | 1 | 0 |
|---|---|---|
| 5 | 4 | 3 |
| 8 | 7 | 6 |

1395

Data dependency count
Upper-right slice-0: L1-1, L2-1, L3-1, total-3
Upper-center slice-1: L1-4, L2-8, L3-16, total-28
Upper-left slice-2: L1-4, L2-8, L3-16, total-28
Current-right slice-3: L1-2, L2-4, L3-8, total-14
Current-center slice-4: L1-8, L2-24, L3-96, total-128
Current-left slice-5: L1-8, L2-24, L3-96, total-128
Lower-right slice-6: L1-2, L2-2, L3-2, total-6
Lower-center slice-7: L1-8, L2-12, L3-24, total-44
Lower-left slice-8: L1-8, L2-12, L3-24, total-44

Fig. 13B

VC-2 DECODING USING PARALLEL DECODING PATHS

PRIORITY CLAIM

This application claims priority under 35 U.S.C. 119(e) to U.S. Provisional Patent Application No. 61/798,790, filed Mar. 15, 2013, which is incorporated herein by reference.

BACKGROUND

The VC-2 video compression standard is an open free-use video-decoding standard contributed by British Broadcasting Corporation (BBC) to the Society of Motion Picture and Television Engineers (SMPTE) standard. The VC-2 standard uses discrete-wavelet-transform (DWT) and interleaved exponential-Golomb (IEG) variable-length-encoding to achieve the desired video compression. Originally designed to compete with the prevailing H.264 standard, it is expected that DWT results in fewer blocky artifacts than the prevailing discrete-cosine-transform (DCT)-based systems. To achieve the low-delay requirement in a serial data interface (SDI) transmission system, SMPTE standardized two low-delay profiles, which include the level-64 using the (2, 2) DWT, and the level-65, using the overlapped (5, 3) DWT. It has been shown that in order to fit a high definition (HD) video into a standard definition SDI (SD-SDI) payload with excellent video quality, the level-65 compression is required.

The VC-2 level-65 is a subset of the low-delay profile with the following attributes:
1. 4:2:2 10-bit sampling with supported resolutions 1920× 1080i29.97, 1920×1080i25, 1280×720p59.94, 1280×720p50.
2. The codec uses only Low-Delay Profile.
3. The codec uses only the LeGall (5, 3) wavelet transform (wavelet index=1).
4. The wavelet depth is exactly 3 levels.
5. The slice size is fixed to be 16 (horizontal)×8 (vertical) in luminance and 8 (horizontal)×8 (vertical) in chrominance.

Conventionally, overlapped DWT is used in the JPEG-2000 standard which is used extensively in digital cameras and medical imaging systems. In the literature, there are many publications on how to reduce the implementation complexity of 2-D DWT. A common property of this technology is that JPEG-2000 based implementation uses an external frame-buffer memory for processing the on-chip DWT/IDWT data. Thus, such publications have primarily focused on how to: minimize the read and write access to the external memory; reduce the on-chip internal memory; speed up data processing; and choose a scan scheme to minimize the memory usage. However, an external memory typically increases costs associated with the chip package size and power consumption, as well as the overall system complexity and bill-of-material (BOM) costs.

BRIEF DESCRIPTION OF THE DRAWINGS

FIG. 2D is used to shows a 3-level DWT process that decomposes a source slice into 10 bands.

FIG. 2E is used to show a 3-level IDWT (inverse DWT) process that synthesizes the 10 bands into the source slice.

FIG. 4 shows a slice-based first-level 2-D (5, 3) synthesis filter process, using real-time generated data from the top-band, the current-band, and the bottom-band slices, to fully synthesize-decode the current 2×4 luminance (Y) pixels.

FIG. 5 shows a slice-based second-level 2-D (5, 3) synthesis filter process, using real-time generated data from the top-band, the current-band, and the bottom-band slices, to fully synthesize-decode the current 4×8 luminance (Y) pixels.

FIG. 6 shows a slice-based third-level 2-D (5, 3) synthesis filter process, using real-time generated from the top-band, the current-band, and the bottom-band slices, to fully synthesize-decode the current 8×16 luminance (Y) pixels.

FIG. 7 shows a slice-based first-level 2-D (5,3) synthesis filter process, using real-time generated data from the top-band, the current-band, and the bottom-band slices, to fully synthesize-decode the current 2×2 chrominance (Cb or Cr) pixels.

FIG. 8 shows a slice-based second-level 2-D (5,3) synthesis filter process, using real-time generated data from the top-band, the current-band, and the bottom-band slices, to fully synthesize-decode the current 4×4 chrominance (Cb or Cr) pixels.

FIG. 9 shows a slice-based third-level 2-D (5,3) synthesis filter process, using real-time generated data from the top-band, the current-band, and the bottom-band slices, to fully synthesize-decode the current 8×8 chrominance (Cb or Cr) pixels.

FIG. 13A shows a nine-slice storage reduction technique used to save 63.3% of IDWT-process data buffer registers.

FIG. 13B shows the nine-slice data dependency chart for processing all three levels of a 2-D IDWT.

DETAILED DESCRIPTION

Figure 1:
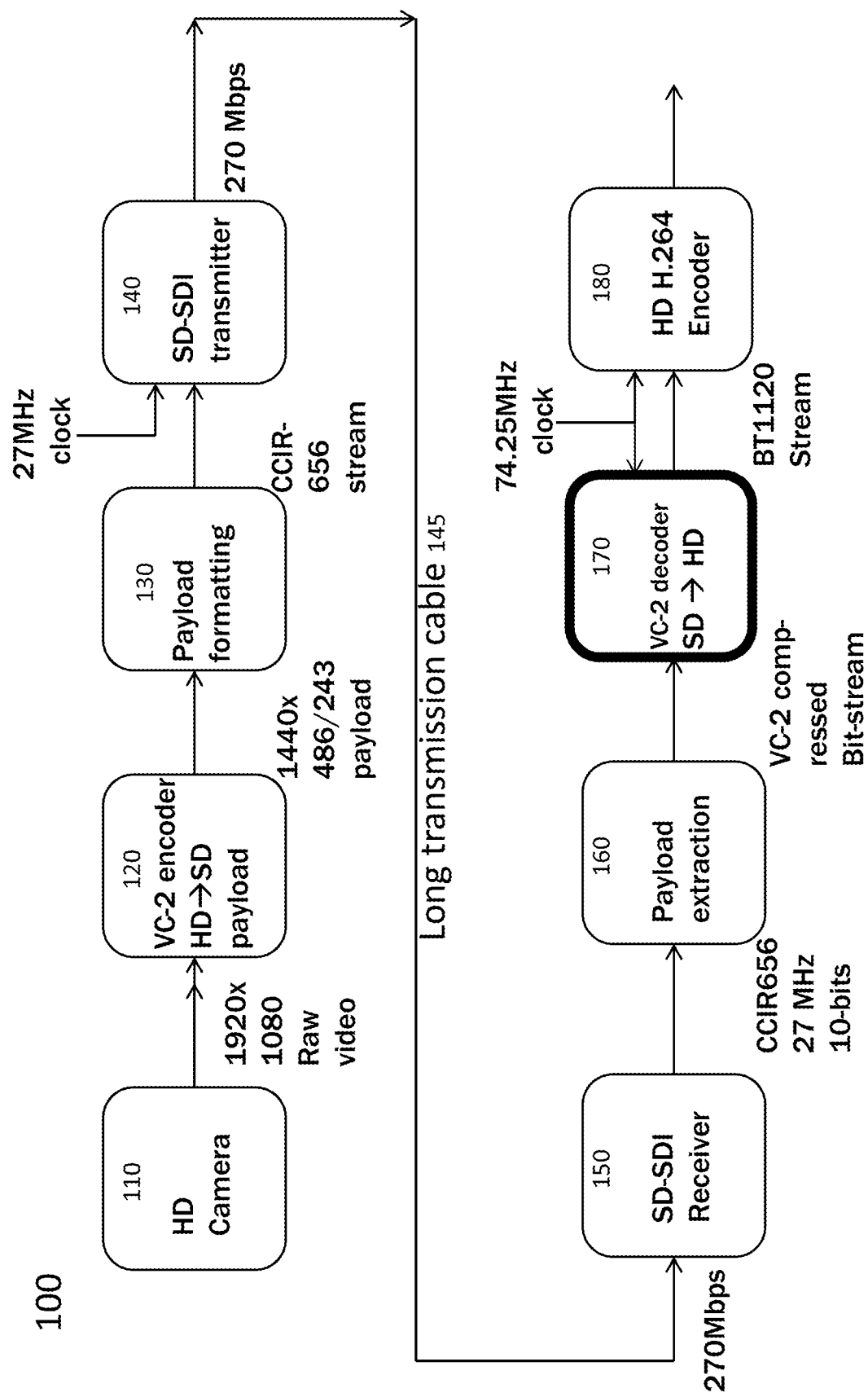
FIG. 1 shows an HD camera and SD-SDI transmission system incorporating a VC-2 encoder and VC-2 decoder.

Described below is a very efficient three-band parallel-processing VC-2 decoding architecture, and methods of its implementation, including a time-overlapped high-throughput 2-D inverse discrete wavelet transform (IDWT) filter design, a multiple-level IDWT sliced-based processing method based on simultaneous real-time input, a slices-bytes equalizer for easy FIFO access, a four-process-in-one-timeslot processing architecture for reducing inter-process communication registers, an IDWT neighborhood slice-storage reducing method, and an IDWT resolution-reduction method. Also described below is an analytic function to evaluate input buffer size based on input and output video formats. In accordance with specific embodiments, a pipelined 1-D IDWT process reduces and preferably halves the overall 2-D IDWT processing time. In accordance with specific embodiments, real-time generated input data are fed directly to an IDWT processor (which can also be referred to as an IDWT module) without using intermediate buffers, which reduces storage and delay. Additionally, specific embodiments avoid the use of an external dynamic memory (as is required in most video compression systems) and eliminate a three-band internal memory. Accordingly, the disclosed architecture and methods allow a VC-2 decoder implementation to use a small amount of internal static memory and registers and renders a very short processing delay. This enables multiple-channels of decoders (e.g., four channels of decoders) to be packed into a single chip.

In accordance with specific embodiments of the present invention, a serial data interface (SDI) receiver chip does not require and does not include an external memory, which is beneficial, since that the small compression ratio of 5-10 in the SDI application range may not justify the extra cost of using an external frame-buffer memory. Such a lack of an external memory is one difference between specific embodiments of this invention and other DWT-based designs.

The overlapped nature of the (5, 3) DWT is difficult to process in real-time, compared to the much simpler non-overlapped (2, 2) DWT used in the level-64 standard. Accordingly, the overlapped nature of the (5, 3) DWT, if not dealt with appropriately, can lead to implementation difficulties. Specific embodiments of the present invention described herein overcome such implementation difficulties and actually take advantage of the overlapped nature of the (5, 3) DWT by using three large bands of internal memory to hold the incoming real-time video data, so that the external memory used in other DWT based designs can be eliminated.

In specific embodiments, an SDI receiver packs four decoder channels into one chip. If not done correctly, such an SDI receiver may require an internal memory size having a gate count that is larger than the sum of the other parts of the whole chip. In other words, it would not be practical to pack such a potentially large sized three-band internal memory into one chip along with the other circuitry need for the SDI receiver. To overcome this problem, specific embodiments described herein can be used to reduce the memory usage.

More generally, described below is a systematic way of eliminating the external memory and the major internal memory that may otherwise be required by an SDI receiver chip. Additionally, three architectures/techniques/schemes to further reduce internal register usage are disclosed.

Certain embodiments related to a parallel processing architecture that uses three sets of small variable-length-decoder (VLD), inverse-quantization (IQ), and inverse-DC-prediction (IDCP) modules running simultaneously to produce the required three-band data for IDWT in real-time. Such real-time repeatedly generated IDWT input data totally eliminates the need to store the very large three-band data in internal memory. Advantageously, the extra cost of using two more sets of VLD, IQ and IDCP modules results in a gate count increase of less than 1%, while they replace an internal memory that would otherwise represent more than 50% of the total gate count were they not eliminated.

To reduce and preferably minimize an input buffer memory storage, a one-port static-RAM can be used to store the compressed input stream extracted from an SD-SDI link. Also described is a technique to calculate a minimum buffer size required for a sustainable SD-to-HD real-time operation. As will be understood from the description below, simple formulas are used to evaluate the buffer size.

In certain embodiments, in order to ease the address calculation logic of reading three variable-length-encoded (VLC) streams simultaneously, the received bytes per slice are equalized by padding the "1" bits to the equalized byte boundary for shorter slices. This technique allows the required three VLC streams to be read out sequentially at equally-spaced addresses, which greatly simplifies the input buffer design.

In certain embodiments, to increase the output throughput of a 2-D IDWT process, consecutive 1-D IDWT processes are overlapped during their two-cycle process time, to almost double its overall speed performance.

Also described below is a three-level slice-based 2D-IDWT implementation method and an input architecture where input data are fed in directly from a real-time generated VLD-IQ-IDCP output using a parallel-processing architecture disclosed. This method and input architecture is used instead of feeding through a storage buffer that takes more storage and delay as in most conventional designs.

In conventional VC-2 decoder designs, a large amount of internal inter-process registers are typically required. To reduce the register usage, specific embodiments combines four processes (VLD-IQ-IDCP-IDWT) into one processing-time-slot, and let them share only one set of communication registers. Additionally, a scheduling scheme and higher speed processors are designed so that the one-time-slot design can be done. Also described below is how this reduces the required inter-module registers by at least 50%, which is a quite significant improvement compared to conventional VC-2 decoder designs.

In accordance with certain embodiments, the elimination of the external memory as well as the elimination of the three-band internal static memory results in a reduction of the required IDWT storage for a 3×3 (i.e., 9-slice) data-block that includes the current slice under decoding. One further improvement of the decoding architecture reduces the storage to 3.3 slices based on the VC-2 property that not all pixels, or their delayed version, in these 9-slices are used for decoding and thus their storage can be eliminated. Further, an addressing scheme according to an embodiment can be used to facilitate the at least 50% reduction in register storage.

Certain embodiments also take advantage of the special IDWT scaling property that the second level is scaled down by 2 from the first level, and the third level is also scaled down by 2 from the second level. As a result, one fewer bit can be stored in the second-level pixels and two fewer bits are needed for storing the third-level pixels. Specifically, this can be used to save another 10% on the total register usage.

FIG. 1 is a high level block diagram of an embodiment of an SDI transmission system 100 incorporating an HD H.264 encoder 180 that may be implemented, e.g., inside a digital video recorder (DVR) for a security surveillance application. Referring to FIG. 1, the SDI transmission system 100 is shown as including an HD camera 110 coupled to an HD H.264 encoder 180, with various intermediate blocks and a transmission cable there-between.

Conventionally, the HD-camera 110 would be connected to the HD H.264 encoder 180 through an HD-SDI link at 1.4875 Gbps rate. Such a high-speed transmission link is limited to a short distance of about 90 meters over a 3C-2V coaxial cable. For security surveillance applications, however, a longer distance is preferred. One way to prolong the transmission distance over the same coaxial cable to about 160 meters is to use a lower-rate SD-SDI at 270 Mbps. In order to reduce the bit-stream rate from the high definition (HD) rate of 1.4875 Gbps to the standard definition (SD) rate of 270 Mbps, video compression is applied to the HD video source. More specifically, in the SDI transmission system 100 shown in FIG. 1, a VC-2 HD-to-SD encoder 120 (which can also be referred to as a Dirac encoder) is used to achieve the video compression. In the implementation shown, the input HD-source picture of size 1920×1080×2 bytes is compressed into an output SD-source picture of size of 1440×486×1 bytes, which achieves a compression ratio of about 6/1. The compressed bit-stream from the VC-2 HD-to-SD encoder 120 is fed to a payload formatter 130 to render a CCIR-656 format video stream with 10-bit parallel data clocked at 27 MHz. An SD-SDI transmitter 140 converts the 10-bit parallel data at 27 MHz into 1-bit serial data clocked at 270 Mbps. In accordance with an embodiment, the HD-camera 110, the VC-2 encoder 120, the payload formatter 130 and the SD-SDI transmitter 140 are components of the camera side of the system. While shows as separate blocks, the payload formatter 130 can be implemented as part of the VC-2 encoder 120. Further, it is noted that blocks 120, 130 and 140 can collectively be referred to as an SDI transmitter device, which when implemented in a single chip, can be referred to as an SDI transmitter chip.

The lower-rate SDI data is transmitted across a coaxial transmission cable 145 to the receive side of the system which includes the HD H.264 encoder 180. More specifically, an SD-SDI receiver 150 first receives and converts the 1-bit serial-data at 270 MHz into a 10-bit parallel CCIR-656 format data stream at 27 MHz. The CCIR-656 format stream goes through a payload extraction module 160 to extract the VC-2 compressed bit-stream, and store it into an input buffer of the VC-2 SD-to-HD decoder 170. While shows as separate blocks, the payload extraction module 160 can be implemented as part of the VC-2 decoder 170. At the VC-2 decoder 170 (which can also be referred to as a Dirac decoder), the compressed bit-stream that was packed in an SD-size of 1440×486×1 bytes is decoded into an HD-size of 1920× 1080×2 bytes. This reconstructed HD video data is visually lossless to the raw data directly coming out of the HD camera 110, and is formatted into the HD BT-1120 format to be fed to the HD H.264 encoder 180. At the H.264 encoder 180, multiple HD scenes from various locations can be monitored in real-time, and also simultaneously compressed and stored for future references. It is noted that blocks 150, 160 and 170 can collectively be referred to as an SDI receiver device, which when implemented in a single chip, can be referred to as an SDI receiver chip. When the SDI transmitter device\chip and the SDI receiver device\chip are being used to extend the distance that an HD video stream can be transmitted, such devices can also be referred to, respectively, as an HD-SDI extender transmitter and an HD-SDI extender receiver.

As can be seen from the above description, a benefit of using either HD-SDI or SD-SDI in a security surveillance system is that HD cameras (e.g., 110) located at various surveillance locations can be connected to a centralized control point where an HD H.264 encoder (e.g., 180) inside a DVR is located. Note that to prolong the camera-to-control-point distance, higher grade cables can also be used. For example, using the RG59 coaxial cable can extend the distance from 90 meters to 200 meters, and using the RG9 grade coaxial cable can further prolong the distance to 300 meters. In practical situations, however, transmission cables are often pre-installed, and the costs of using a higher grade cable plus its installation far exceeds the costs of adding a simple VC-2 encoder and an SD-SDI transmitter at the camera side and an SD-SDI receiver and adding a VC-2 decoder at the H.264 encoder side. This is a reason why pairing of a VC-2 encoder and a VC-2 decoder is useful to the economical deployment of HD surveillance systems in the security market.

Further, since a VC-2 decoder (e.g., 170) is located at a central control point where four or more HD channels are normally packed together with an HD H.264 encoder (e.g., 180), it is useful to pack four VC-2 decoder channels into one chip to comply with the existing installments. In certain embodiments described herein, a focus is on simplifying the design of a VC-2 decoder (e.g., 170), which is the most challenging design among all components in the described SDI transmission system 100.

Figure 2A:
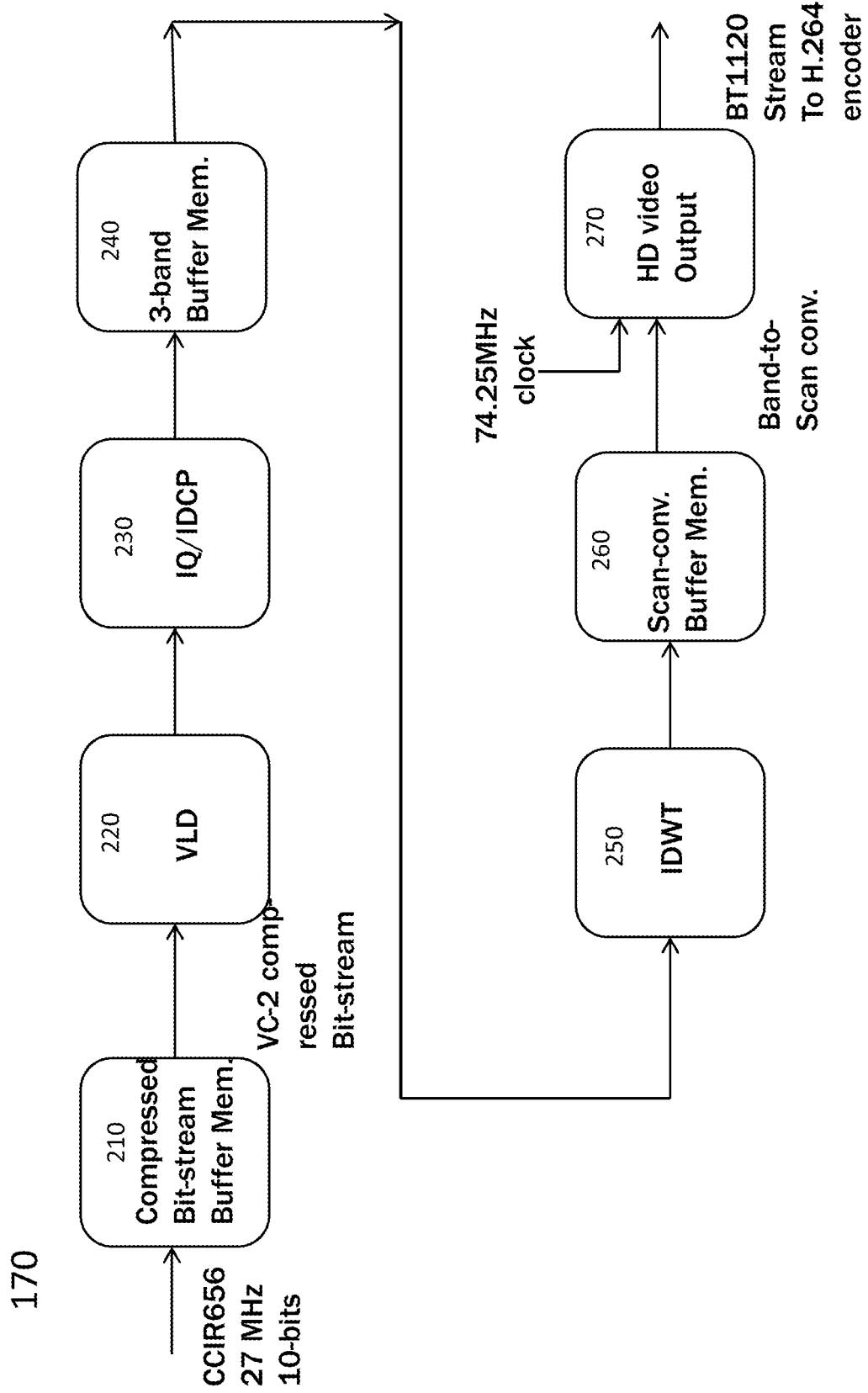
FIG. 2A shows the major processing modules (VLD, IQ/IDCP and IDWT) of an embodiment of a VC-2 decoder.

FIG. 2A is a block diagram that shows the major processing modules (VLD, IQ/IDCP and IDWT) of a potential implementation of the VC-2 decoder 170. Referring to FIG. 2A, the VC-2 decoder 170 is shown as including a compressed bit-stream buffer memory 210, a variable length decoder (VLD) module 220, an IQ/IDCP module 230, a 3-band buffer memory 240, an IDWT module 250, a scan-conversion buffer memory 260 and an HD video output module 270. In this configuration, the 3-band internal buffer memory 240 is used instead of external memory. However, this 3-band internal buffer memory 240 may be significantly larger than desired.

In FIG. 2A, the IDWT module 150 is the major processing module, while the VLD module 220 and the IQ/IDCP module 230 process and generate its input data. Referring to FIG. 2A, at an input of the VC-2 encoder 170 the CCIR-656 bit-stream that contains the VC-2 compressed bit-stream in its active-areas are extracted and put into an input memory buffer 210. In a real-time video decoder design, it is important to allow for a continuous video display pipe at the HD output module 270. Since the SD-input CCIR-656 format and the HD-output BT-1120 format have different active and blanking regions, the buffer 210 is used to store the input compressed data, so that a task scheduler can start the decoding and output video process at a later time to assure that once the output video is started, its display pipe will not be interrupted. Conventionally, the selection of a suitable size for the input buffer 210, so that a scheduler can be easily designed, involves a trial-and-error process that also requires input and output data pipe simulations based on various video formats that need to be linked together.

In accordance with specific embodiments, to ease simulation and trial efforts, the active duty-cycle (DUCY) can be defined as shown below:

$$DUCY = (\text{active region})/(\text{total envelope}), \quad \text{Equation (1)}$$

It can be shown that the minimum buffer size is as shown below:

$$\text{input\_buffer\_size} = (HD\_DUCY - SD\_DUCY) \times SD\_active\_size, \quad \text{Equation (2)}$$

where SD_active_size is the total payload contained in one SD picture.

Figure 2B:
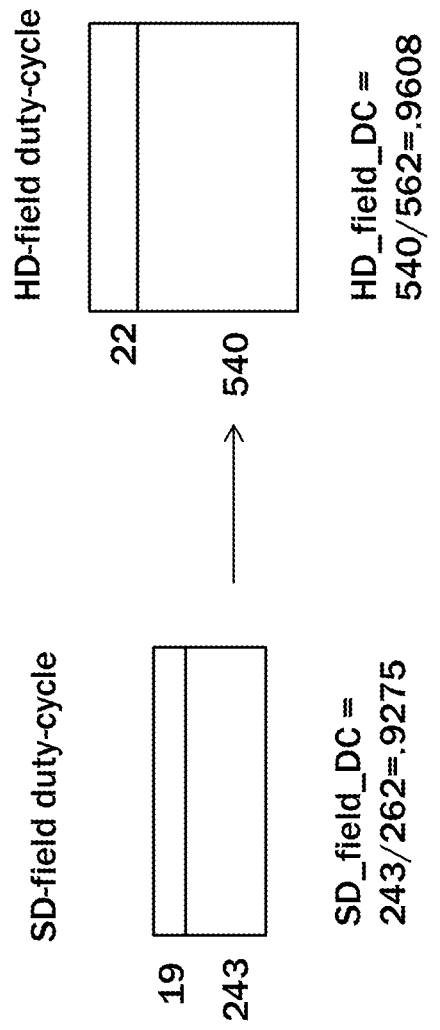
FIG. 2B is used to show the buffer-size required to bridge SD to HD format for real-time HD display.

FIG. 2B shows that for decoding an SD-field input to generate a continuous displayable HD-field output, the required SD_active_size is 1440×243=349,920 bytes and the minimum input_buffer_size is 11,652 bytes, based on Equations (1) and (2). For converting an SD-frame input to an HD-frame input, since the SD_active_size is doubled, the minimum input_buffer_size is also doubled to 23,304 bytes. That is, (HD_DUCY—SD_DUCY)×SD_active_size×2= (0.9608−0.9275)×349,920×2=23,304 bytes. Once the minimum input buffer-size is determined, task scheduler timing can be easily designed to achieve this limit while maintaining a seamless (i.e., continuous) and uninterrupted video output display pipe.

Referring again to FIG. 2A, in the VC-2 level-65 standard, the VLD module 220 is an interleaved exp-Golomb (IEG) decoder. To meet the required timing budget for real-time video, a one-cycle-per-symbol algorithm is used to decode up to N bits of variable-length-code data per cycle, where N is the number of bits representing the sign and magnitude of the longest code word generated from the IEG encoder. It is normally limited by the number of bits required to represent the lowest few frequency components of a DWT process.

In FIG. 2A, the VLD 220 decompresses a compressed variable-length-bit-stream into "symbols" that represent the sign and magnitude of a DWT pixel. The VLD module 220 outputs VLD decoded symbols in dependence on the VC-2 compressed bit stream it received from the buffer memory 210. The VLD decoded symbols are fed to an inverse quantization module (IQ) to reconstruct their original higher-frequency AC values, followed by an inverse DC-Prediction (IDCP) module to reconstruct their DC values. In other words, the IQ module recovers the original magnitude of the original source symbol that was DWT-processed; and the IDCP module recovers the "DC" value, which represents the original source-symbol's per-slice-average-value that was DWT-processed. While the IQ and IDCP module are collectively shown as an IQ/IDCP module 230 in FIG. 2A, these modules can be separated if desired.

Still referring to FIG. 2A, the output of the IQ/IDCP module 230 is shown as being provided to the 3-band buffer memory 240, an output of which is provided to the Inverse-Wavelet-Transform (IDWT) module 250. The IDWT module 250 synthesizes the decoded pixel value from the 10-band DWT-processed, i.e., 10-band decomposed data symbols. The output of the IDWT module 250 is provided to the scan-conversion buffer memory 260, the output of which is provided to the HD video output module 270.

In VC-2 level-65, only one quantization index is used for all DC and AC frequency components of the DWT. To emphasize the lower-frequency components, they are scaled up by 2 after each level of DWT. On the decoder side, the lower-frequency components have to be scaled down by 2 to reconstruct their original values. As will be shown in and described below with reference to FIG. 14, this level-scaling property allows fewer bits to be used in the IDWT storage to reduce the hardware cost. The overall decoder hardware complexity is mainly affected by the processing requirement of IDWT, which will be discussed below with reference to FIG. 3.

Figure 2C:
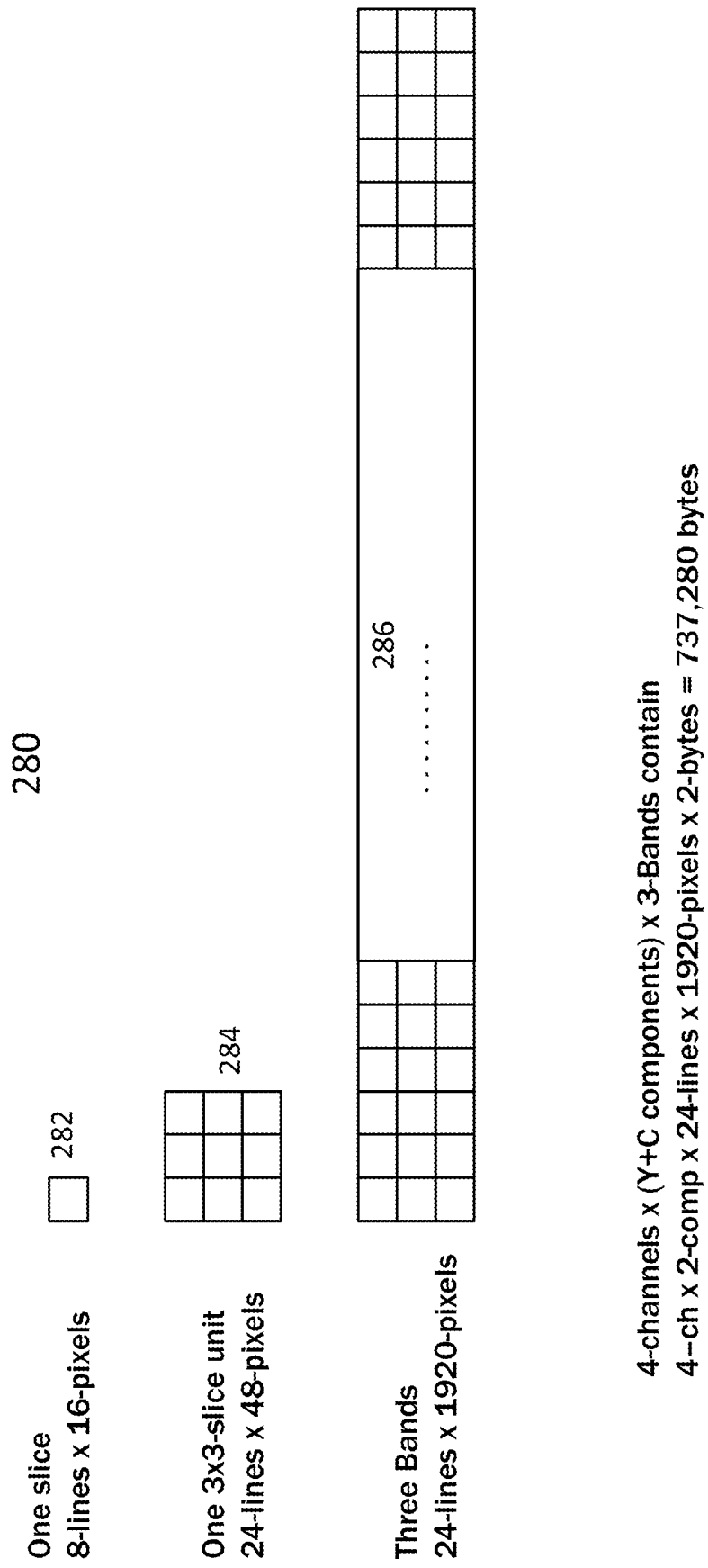
FIG. 2C is used to show processing elements associated with a 2-D Inverse-Discrete-Wavelet-Transform (IDWT) for the luminance component (Y).

FIG. 2C shows processing elements 280 of a 2-D IDWT for the luminance component (Y). The most basic unit, labeled 282, is a slice of size 8 lines vertically by 16 pixels horizontally. It can be shown that to get the final results of the current slice, data from all eight neighbors are needed, this expands the one-slice data dependency to a 3×3-slice data-block 284 (which is also referred to as a 9-slice data block) with a size of 24 lines and 48 pixels. Since the data arrives in real-time in a line-scan order, in order to get the required data for all slices across a line span, a total of three bands, labeled 286, are required, which means that 24 lines by 1920 pixels may need to be stored in the internal memory 240. Note that the band size is proportional to the line-width, that is, 1920 pixels, and the number of color components, that is, Y and Cb/Cr. Where the desire is to pack four channels into one decoder chip, the required size of the three-band buffer memory 240 would amount to 737,280 bytes. In order to avoid using such a huge amount of internal memory, certain embodiments of the present invention, which are described below, provide for a more efficient decoder architecture. As the term is used herein, a slice, which can also be referred to as a data-slice, is a data processing unit of the slice-based IDWT. A band, which can also be referred to as a data-band, includes 120 slices of 8-lines×16 pixels, and is a block of data that is stored (in real-time video) to enable the processing of slices. In specific embodiments of the present invention that synthesize decoded pixel values using the overlapped (5,3) IDWT filter, described herein, three data-bands are simultaneously processed in parallel to enable the three-band buffer memory 240, described above with reference to FIG. 2A, to be eliminated.

To better understand the 3-level IDWT process, FIG. 2D is used to show how a 3-level DWT process is done in the VC2 level-65 encoding process to decompose a source slice into 10 frequency components (also referred to as sub-bands). First, a source slice 2310 of 8-lines×16-pixels undergoes a horizontal analysis filtering process to decompose it into the horizontal-low-band L3 2312 and the horizontal-high-band H3 2314. L3 and H3 further undergo a vertical analysis filtering process to be decomposed into four level-3 sub-bands, namely, LL3 2316, LH3 2318, HL3 2320 and HH3 2322. This finishes the 3rd-level DWT process, which result in four frequency band components, each of size 4-lines×8-pixels, being generated. The three higher band components, LH3, HL3, and HH3 have finished their DWT process and are ready for the subsequent quantization process. The low-frequency component, LL3, then undergoes a similar 2nd-level horizontal and vertical analysis DWT filtering process to generate the four 2nd-level frequency components LL2 2328, LH2 2330, HL2 2332, and HH2 2334. Each 2nd-level frequency component has a size of 2-lines×4-pixels. The three higher-band components, LH2, HL2, and HH2, have finished their 2nd-level DWT process and are ready for the subsequent quantization process. The 2nd-level low band LL2 2328, then undergoes a similar 1st-level horizontal and vertical analysis DWT filtering process to generate the four 1st-level frequency components LL0 2340, LH1 2342, HL1 2344, and HH1 2346. Each 1st-level frequency component has a size of 1-line×2-pixels. The LL0 component goes through a DC-prediction process, while all four bands LL0, LH1, HL1, and HH1 go through a quantization process. The 10-band decomposed, DC-predicted, and quantized result then goes through a variable-length-encoding (VLE) process to be compressed into the desired payload size.

FIG. 2E is used to show the inverse DWT (IDWT) process that synthesizes the 10 frequency-band components generated by the DWT into the original source slice. The IDWT starts from the 1st-level synthesis, where the four 1st-level band components, LL0 2440, LH1 2442, HL1 2444, and HH1 2446, are first vertical-filtered and then horizontal-filtered to synthesize into the LL2 2428 2nd-level low-low band component. During these two filtering processes, the pixels in these 4 band components are first interleaved and then filtered to generate the resulting 2-lines×4-pixels LL2 component. The 2nd-level IDWT process then interleaves the four 2nd-level components, i.e., LL2 2428, LH2 2430, HL2 2432, and HH2 2434, and then does vertical-filtering, followed by horizontal-filtering, to synthesize the 4-lines×8-pixels LL3 component 2416. Then the 3rd-level IDWT process interleaves the four 3rd-level components, i.e., LL3 2416, LH3 2418, HL3 2420, and HH3 2422, and then does vertical-filtering, followed by horizontal-filtering, to synthesize the original source slice 2410. In the subsequent disclosure, the 3-level IDWT processes show special implementation techniques based on the above basic IDWT rule.

The synthesis filter of LeGall (5, 3) used in the VC-2 Low-Delay Profile Level 65 has the following formula:

$$\text{Step 1: } A_{2n} -= (A_{2n-1} + A_{2n+1} + 2)/4 \qquad \text{Eq. (3)}$$

$$\text{Step 2: } A_{2n+1} += (A_{2n} + A_{2n+2} + 1)/2 \qquad \text{Eq. (4)}$$

Step 1 can equivalently be expressed as: $A_{2n}=A_{2n}((A_{2n-1}+A_{2n+1}+2)/4)$; and Step 2 can equivalently be expressed as: $A_{2n+1}=A_{2n+1}+((A_{2n}+A_{2n+2}+1)/2)$. In the above equations, the "A" represents a pixel-data value in the IDWT domain, with each such pixel-data value including, e.g., 14-16 bits.

For a slice of size 16×8, the boundary condition needs to be handled properly. In the VC-2 standard, out of picture boundary pixels that are used to process a 2-D IDWT are boundary-extended, meaning they are assigned the same value as the closest same-band boundary pixel, at both the encoder and the decoder, so that consistent decoder results are generated using different decoder implementations, and a smooth-looking boundary similar to the original source video is generated.

Figure 3A:
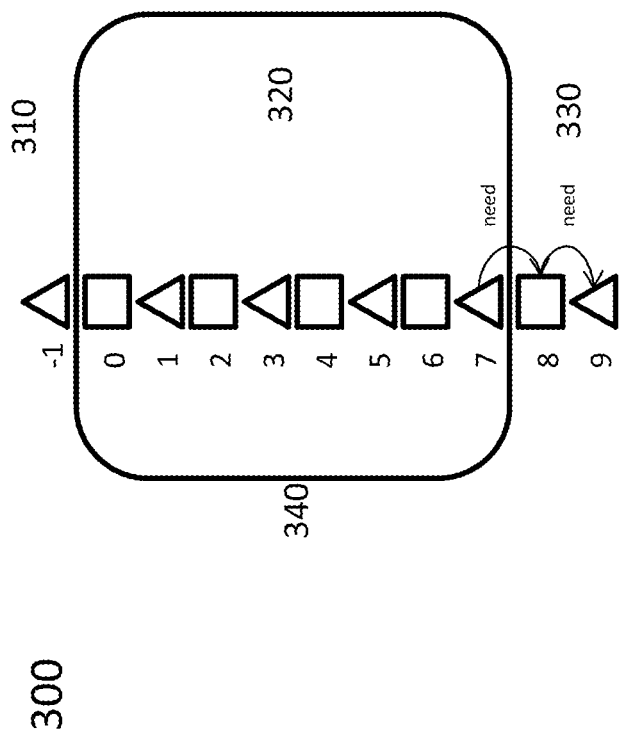
FIG. 3A is used to show a 1-D (5, 3) synthesis filter process, using one pixel from the previous slice and two pixels from the next slice to fully synthesize-decode the current slice's 1×8 pixels.

FIG. 3A is used to show a 1-D (5,3) synthesis filter process 300, using one neighboring pixel on top (associated with a previous slice) and two neighboring pixels at bottom (associated with a next slice), to fully synthesis-decode the current slice's 1×8 pixels. Referring to FIG. 3A, the region labeled 310 corresponds to the previous slice, the region labeled 320 corresponds to the current slice, and the region labeled 330 corresponds to the next slice. Additionally, the rectangles in regions 320 and 330 represent even-numbered data, and triangles represent the odd-numbered data, and the bounded region 340 represents the current slice boundary. For Step 1, the even-numbered $A_{2n}$ are calculated based on the input of odd-numbered $A_{2n-1}$ and $A_{2+1}$. Therefore one top data $A_{-1}$ is needed for calculated $A_0$. For Step 2, the odd-number $A_{2+1}$ are calculated based on the input of even-numbered $A_{2n}$ and $A_{2n+2}$. As is needed to calculate $A_7$, but $A_8$ also needs to be calculated from $A_9$ in Step 1. So for calculating a slice in the FIG. 3, three extra data beyond the slice boundary are needed: $A_{-1}$, $A_8$, and $A_9$, for processing the LeGall (5.3) synthesis filter. Therefore, it can be concluded that one extra data above the slice, and two extra data below the slice are needed. In a real-time video operation, data keeps on coming in continuously. Without using an external memory, this rule governs the number of video lines that are needed to be stored in order to compute the IDWT for a slice of size 8-lines×16-pixels.

Figure 3B:
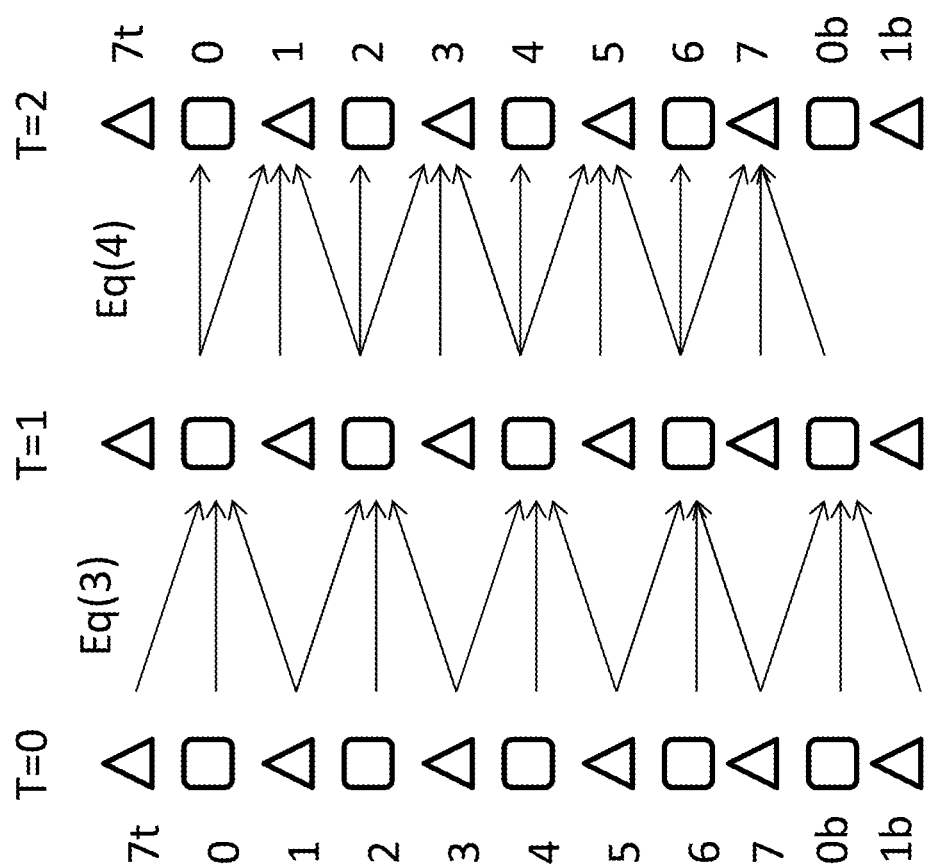
FIG. 3B is used to show two steps of the 1-D (5,3) IDWT process introduced with reference to FIG. 3A, where the two steps take 2 cycles to complete.

FIG. 3B is used to show two steps of the 1-D (5,3) IDWT process introduced with reference to FIG. 3A, where the two steps take 2 cycles to complete. After 2 cycles, pixels 0-7 on the right are the result. More specifically, FIG. 3B further shows the time dependency for the implementation of Equations (3) and (4). For Step 1 at T=1, the even-numbered $A_{2n}$ are calculated based on the input of odd-numbered $A_{2n-1}$ and $A_{2n+1}$. Therefore one top data $A_{-1}$ is needed for calculated $A_0$. For example, at time T=1, pixel-0 is generated using Eq. (3) based on pixel values 7t, 0, and 1 at time T=0; pixel-2 is generated based on pixel values 1, 2, and 3 at time T=0; and pixel-0b is generated based on pixel values 7, 0b, and 1b at time T=0. This process also generates the final result for pixels 0, 2, 4, and 6 at time T=2. Note that even though the pixel-0b is not need for the final IDWT result at time T=2, the pixel-0b is generated for use in step 2 below.

For Step 2 at T=2, the odd-number $A_{2n+1}$ are calculated based on the input of even-numbered $A_{2n}$ and $_{A2n+2}$. $A_8$ (pixel-0b) is needed to calculate $A_7$, but $A_8$ also needs to be calculated from $A_9$ (pixel-1b) in Step 1. For example, pixel-1 is generated using Eq. (4) based on pixel values 0, 1, and 2 at time T=1; pixel-3 is generated based on pixel values 2, 3, and 4 at time T=1; and pixel-7 is generated based on pixel values 6, 7, and 0b at time T=1. This process generates the final result for pixels 1, 3, 5, and 7 at time T=2, and the 2-step 1-D IDWT process is done. This process normally takes two clock cycles to complete.

FIG. 4 is used to show a slice-based first-level 2-D (5, 3) synthesis filter process 400, using real-time generated data from the top, the current, and the bottom-slice, to fully synthesize-decode the current 2×4 luminance (Y) pixels. This process 400 is a 2-D extension of the 1-D process described above. First, an array of size 7×5 (as shown) is formed from the inverse-quantized transform data in real-time. In FIG. 4, each square of the 7×5 array corresponds to a pixel, e.g., a 16-bit valued pixel. The 7×5 pixels (i.e., (4+1+2)×(2+1+2) pixels), are used to synthesize the required 4×2 low-low band of 1st-level IDWT. In FIG. 4, rows are labeled 410 through 430, and columns are labeled 440 through 470. The indices on the top-left corner of each tile represent the original coordinates in y and x directions with respect to the upper-left corner of the current slice (0,0). For example, the top row 410 is constructed by data located at the 6th-line atop from the top-band, the current row 415 and 420 are constructed from the $0^{th}$ and $1^{st}$ lines from the current-band, while the bottom two rows 425 and 430 are constructed by data located at the $8^{th}$ and $9^{th}$ lines below the origin from the current bottom-band. Similarly, column 440 is constructed by the $12^{th}$ column to the left from the left-slice, columns 445, 450, 455, and 460 are constructed by the $0^{th}$, $2^{nd}$, $1^{st}$, and $3^{rd}$ columns from the current-slice, and columns 465 and 470 are constructed by the $16^{th}$ and $18^{th}$ columns from the right-slice. Altogether, data from all eight neighboring slices of the current slice are needed to process the 2-D synthesis of the low-low-level-1 (LL1) band as shown from the data construction.

In accordance with an embodiment, the 9-slice data-block is provided directly by real-time VLD-IQ/IDCP processed data with three sets of 2-slice buffer without going through external memory or internal memory (e.g., 240 in FIG. 2A). Accordingly, this slice-based IDWT provide advantages compared to conventional designs that use an external memory and/or an internal memory. In subsequent descriptions for other levels of IDWT and the chrominance component IDWT, a similar input mechanism can be used and will not be further stated.

Still referring to FIG. 4, to synthesize the 2-D LL1 result, first 1D synthesis filtering is done in the vertical direction for the seven columns 440, 445, 450, 455, 460, 465 and 470. This is followed by 1D synthesis filtering in the horizontal direction for the three rows 415, 420 and 425. In an embodiment, only the interior portion 5×3 (marked in thick outline) of the array are retained, so filtering for rows 410 and 430 is not needed. The sub-array of size 5×3 is the synthesis result for Level 1, which is downscaled by 2 and will be applied to the Level-2 IDWT as described below with reference to FIG. 5.

Figure 5:
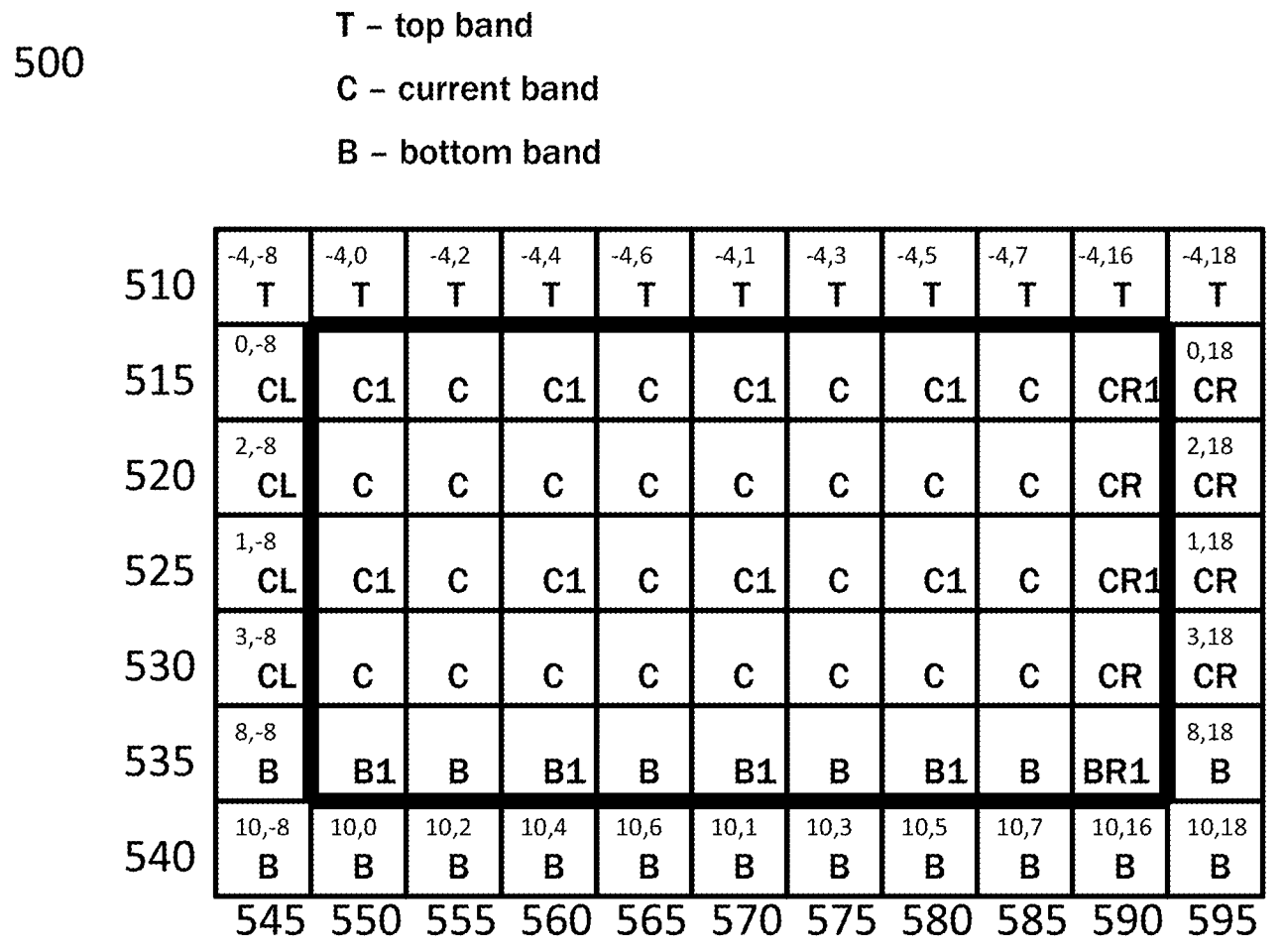

FIG. 5 shows a slice-based 2nd-level (i.e., Level 2) 2-D (5,3) IDWT process 500 for the luminance component Y, using real-time generated data from a current slice, and its eight neighboring slices (i.e., data from all 3×3 slices are used here), to fully synthesize the current 4×8 luminance (Y) pixels. First, an array of size 11×7 is formed from the inverse-quantized transform data by combining the second-level DWT data, that is, the high-low (HL2), low-high (LH2), and high-high (HH2) frequency bands of a level-2 DWT from the current slice as well as from its eight neighboring slices generated and applied directly without storage from a real-time process. In FIG. 5, rows are labeled 510 through 540, and columns are labeled 545 through 595.

After the above array forming process, the Level 1 synthesis results obtained from the previous figure, as marked in by "C1", "CR1", "B1" and "BR1" in rows 515, 525 and 535, are used to fill the remaining low-low (LL1) band array components as shown. The data required are also generated and applied directly in real-time without storage as before.

Then similar 1D synthesis processes (vertically and then horizontally) are performed sequentially to generate the Level-2 result. Finally, the interior portion 9×5 is retained as the synthesis result for Level 2. The sub-array, named low-low-2 frequency band (LL2) of size 9×5 is downscaled by 2 and will be applied to the Level 3 IDWT, as described with reference to FIG. 6.

Figure 6:
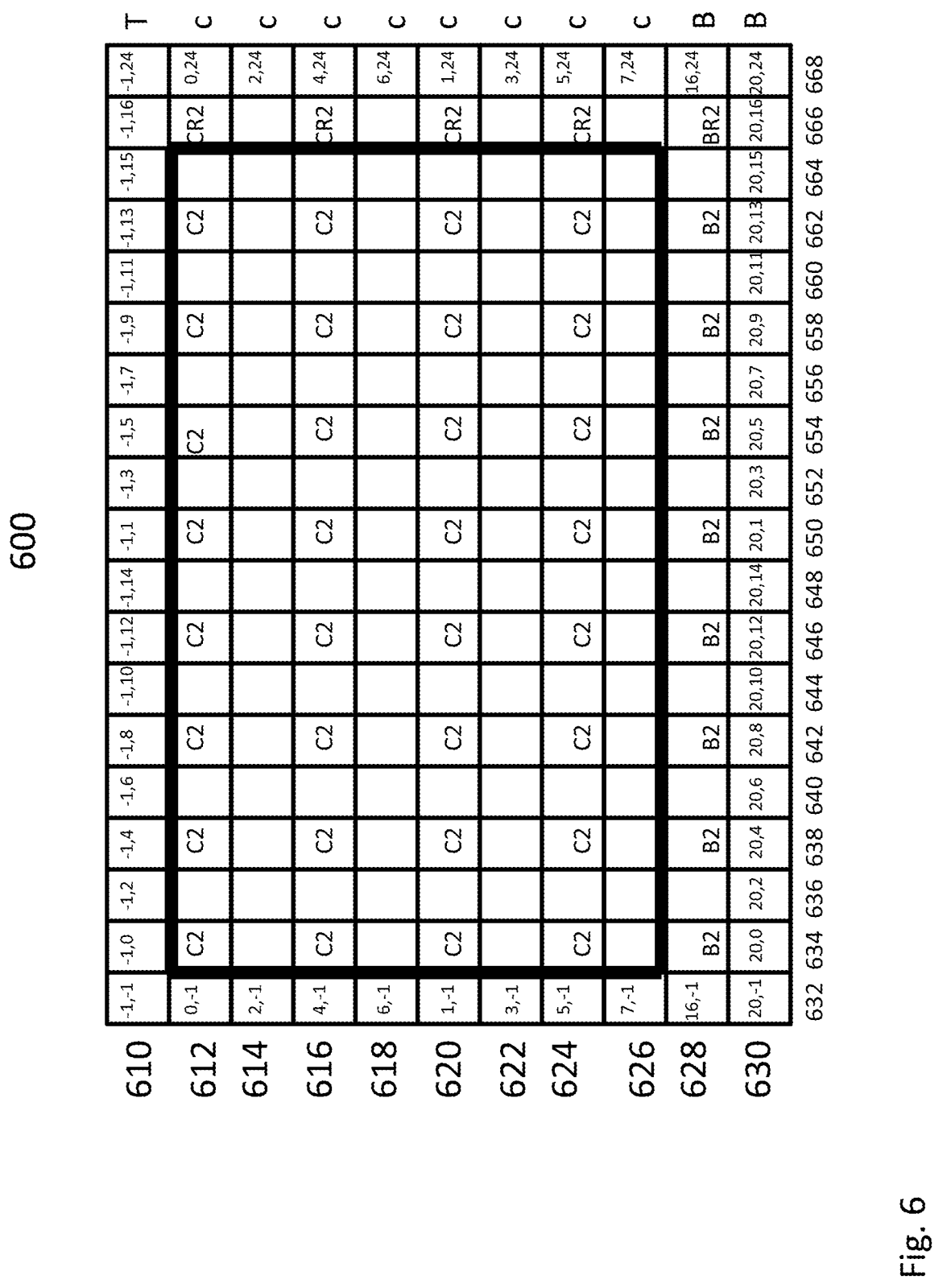

FIG. 6 shows the Level 3 of 2D (5, 3) IDWT process 600 as the final stage for the luminance component (Y) in this embodiment. First an array of size 19×11 is constructed from the inverse-quantized transform data supplied from the IQ/IDCP process using real-time generation without storage. The 9×5 result obtained from the level-2 process above, as marked by "C2", "CR2", "B2" and "BR2" in rows 612, 616, 620, 624 and 628, are then applied in real-time to fill the remaining low-low band (LL2) array components as shown in the figure. In FIG. 6, rows are labeled 610 through 630, and columns are labeled 632 through 668.

Then similar 1D synthesis processes (vertically and then horizontally) are performed sequentially to generate the Level-3 result. Finally, the interior portion 16×8 is retained as the synthesis result for Level 3. This output then goes through three magnitude-adjustment processes, that is, a signed 2-bit down-scaling process, a magnitude-clipping process, and a magnitude-offset process to get into the data range suitable for BT-1120 standard output. This finishes the Y-component's 2-D IDWT process.

Figure 7:
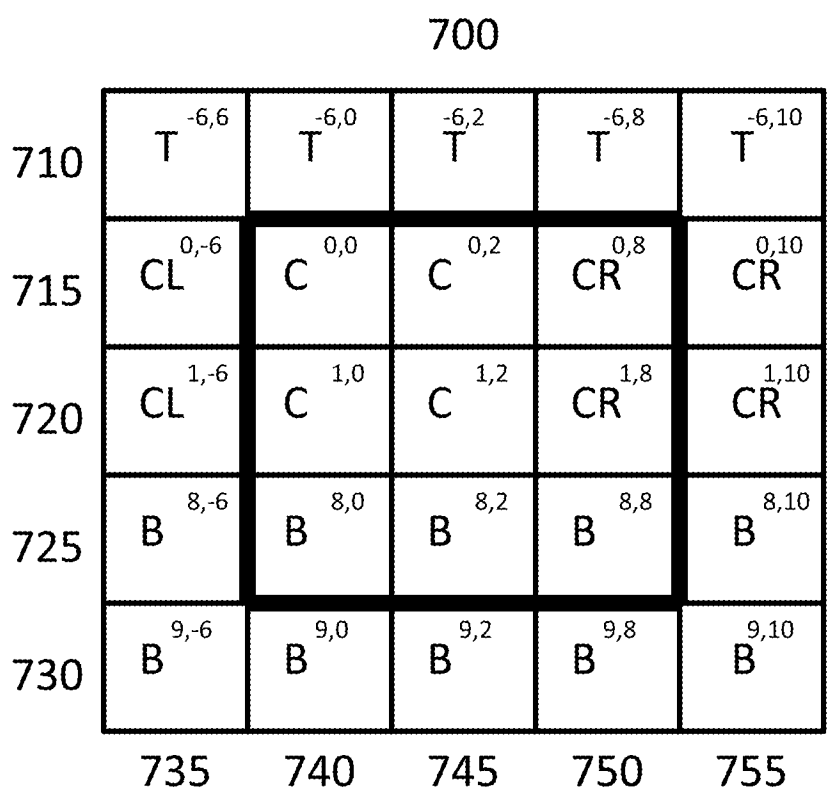

FIG. 7 shows a slice-based first-level 2-D (5,3) IDWT process 700, using real-time generated data from a current slice and its eight neighboring-slices, to fully synthesize the current 2×2 chrominance (Cb/Cr) pixels. In other words, FIG. 7 shows the first-level of 2-D (5, 3) IDWT 700 for the chrominance components Cb or Cr. In FIG. 7, rows are labeled 710 through 730, and columns are labeled 735 through 755. First, an array of size 5×5 as shown is formed from the VLD-IQ/IDCP real-time generated data without using static memory storage. The indices on the top-left corner of each tile represent the original coordinates in y and x directions with respect to the upper-left corner of the current slice (0,0). For example, the top row 710 is constructed by data located at the 6th-line atop from the top-band, the current row 715 and 720 are constructed from the $0^{th}$ and $1^{st}$ lines from the current-band, while the bottom two rows 725 and 730 are constructed by data located at the $8^{th}$ and $9^{th}$ lines below the origin from the bottom-band. Similarly, column 735 is constructed by the $6^{th}$ column to the left from the left-slice, columns 740 and 745 are constructed by the $0^{th}$ and $2^{nd}$ columns from the current-slice, and columns 750 and 755 are constructed by the $8^{th}$ and $10^{th}$ columns from the right-slice. Altogether, data from all eight neighboring slices of the current slice are generated from a real-time process to enable the 2-D synthesis of the low-low-level-1 (LL1) band as shown from the data construction.

To synthesize the 2-D LL1 result, first 1D synthesis filtering is done in the vertical direction for the five columns 735, 740, 745, 750 and 755. This is followed by 1D synthesis filtering in the horizontal direction for the three rows 715, 720 and 725. Note that only the interior portion 3×3 (marked in thick outline) of the array are retained, so filtering for rows 710 and 730 are not needed.

The sub-array of size 3×3 is the synthesis result for Level 1, which is down-scaled by 2 and will be applied to the Level 2 IDWT as described in the following figure.

FIG. 8 shows a sliced based 2nd-level 2-D (5,3) IDWT process, using real-time generated data from a current slice, and its eight neighboring-slices, to fully synthesize the current 4×4 chrominance (Cb/Cr) pixels. In other words, FIG. 8 shows the Level 2 of 2-D (5, 3) IDWT process 800 for the chrominance components Cb or Cr. First, an array of size 7×7 is formed from the inverse-quantized transform data by combining the second-level DWT data, that is, the high-low (HL2), low-high (LH2), and high-high (HH2) frequency bands of a level-2 DWT from the current slice as well as from its eight neighboring slices in real-time from the VLD-IQ/IDCP process without using a memory storage. In FIG. 8, rows are labeled 810 through 840, and columns are labeled 845 through 875.

After the above array forming process, the Level 1 synthesis results obtained from the previous figure, as marked in by "C1", "CR1", "B1" and "BR1" in rows 815, 825 and 835, are used to fill the remaining low-low (LL1) band array components as shown.

Similar 1D synthesis processes (vertically and then horizontally) are performed sequentially to generate the Level-2 result. Finally, the interior portion 5×5 is retained as the synthesis result for Level 2. The sub-array, named low-low-2 frequency band (LL2) of size 5×5, is downscaled by 2 and will be applied to the Level 3 IDWT in the next Figure.

Figure 9:
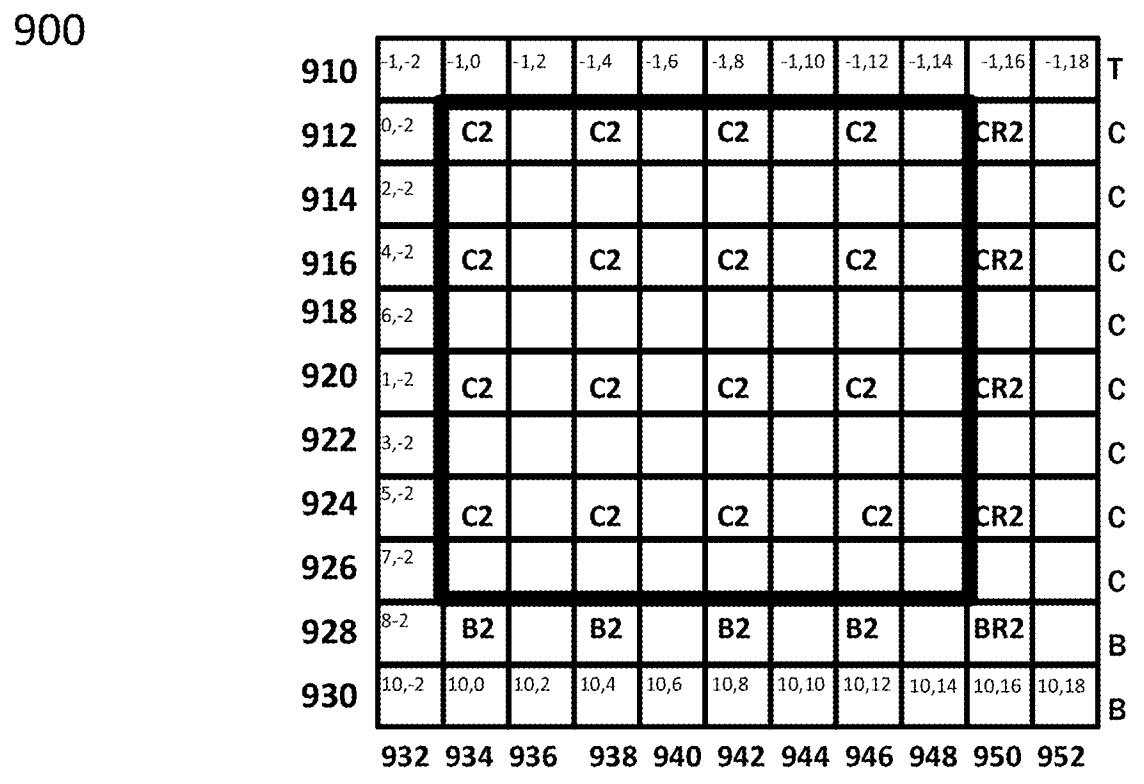

FIG. 9 shows a slice-based 3rd-level 2-D (5,3) IDWT process 900, using real-time generated data from a current slice and its eight neighboring slices, to fully synthesize the current 8×8 chrominance (Cb/Cr) pixels. In other words, FIG. 9 shows the Level 3 of 2D (5, 3) IDWT process 900 as the final stage for the chrominance components Cb or Cr. In FIG. 9, rows are labeled 910 through 930, and columns are labeled 932 through 952. First an array of size 11×11 is constructed from the VLD-IQ/IDCP real-time process and the 5×5 result obtained from the level-2 process described above, as marked by "C2", "CR2", "B2" and "BR2" in rows 912, 916, 920, 924 and 928.

Then similar 1D synthesis processes (vertically and then horizontally) are performed sequentially to generate the Level-3 result. Finally, the interior portion 8×8 is retained as the synthesis result for Level 3.

This output then goes through three magnitude-adjustment processes, that is, a signed 2-bit down-scaling process, a magnitude-clipping process, and a magnitude-offset process to get into the data range suitable for BT-1120 standard output. This finishes the Cb or Cr component's 2-D IDWT process.

In accordance with specific embodiments, Cb and Cr components are interleaved horizontally across a line. This reduces the number of internal memory instances and overall cost. Both Cb and Cr components have identical data processes.

The hardware implementation of a 2-D IDWT of size N-columns by M-rows are done by repeated applications of 1-D IDWT in both directions. First each M×1 column is synthesized vertically from column-1 to column-N, and then the resulting N×1 horizontal vectors from row-2 to row-(M−1) are synthesized horizontally to get the 2-D IDWT result.

Figure 10:
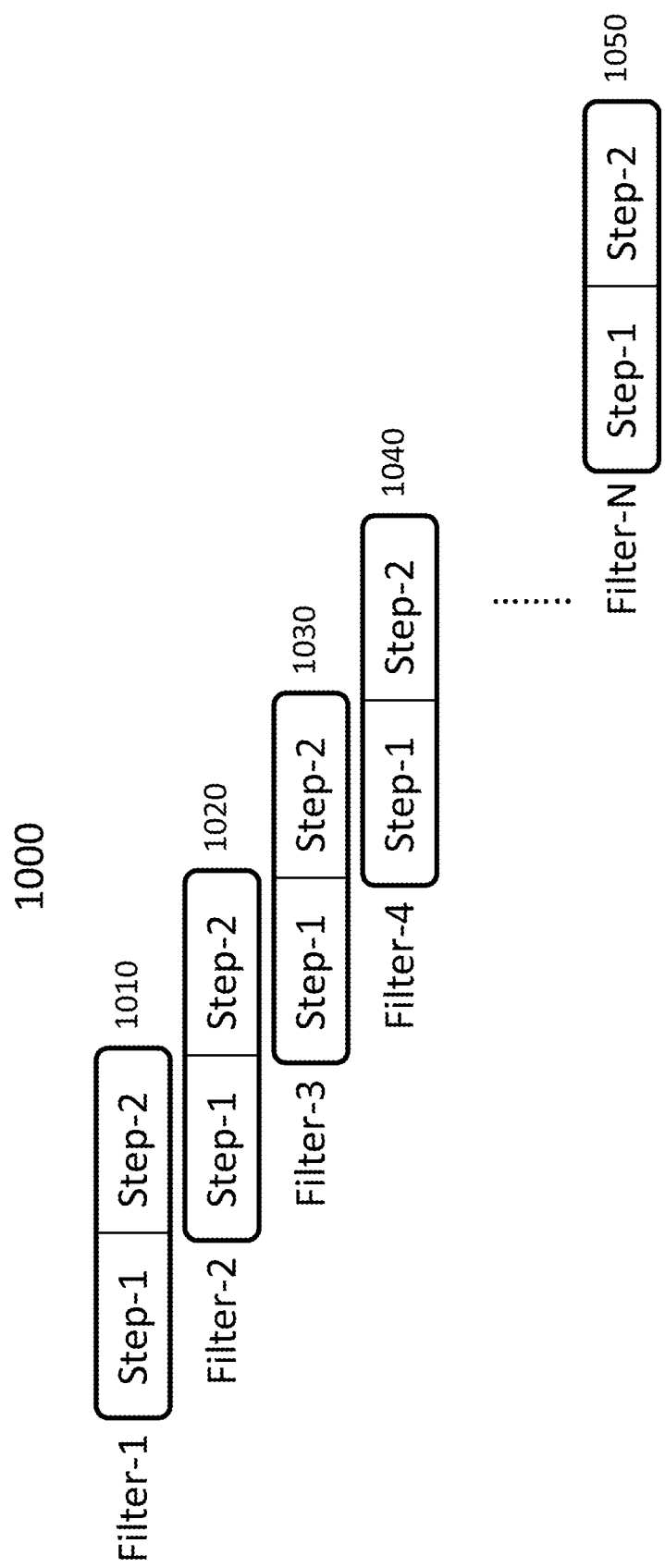
FIG. 10 shows a time-overlapped pipelined 2-D IDWT synthesis filter design with a very high throughout.

FIG. 10 shows a time-overlapped 2-D IDWT synthesis filter design with a very high throughput. More specifically, FIG. 10 shows an efficient pipelined 2-D IDWT design 1000 to squeeze two cycles that are needed to calculate the two steps of Equations (3) and (4) into approximately one cycle. The pipelined architecture overlaps each of the 1-D filter processes 1010, 1020, 1030, 1040, . . . and 1050 by one cycle, so that one filter's second-step is running in parallel with the next filter's first-step and the filter module's logic is busy substantially all the time. Each cycle's output result from the 1-D filter represents the 2-step results of each pipelined 1-D filter process.

The average throughput for each 1-D synthesis is equal to pipe_length/(pipe_length+1), which is very close to one 1-D filter result per cycle. In other words, a pipelined two-dimensional (2-D) IDWT synthesis filter is implemented using N overlapped one-dimensional (1-D) IDWT filters, wherein N, the pipe-length, is a number of 1-D IDWT filters that are executed consecutively to generate a 2-D IDWT result. Such use of the N overlapped 1-D IDWT filters achieves an average throughput of N/(1+N) 1-D IDWT filter results per clock cycle. This greatly reduces the number of 1-D filter instances that are needed when the overall timing budget for the IDWT process is very tight. The cost of this architecture is that the intermediate result from step-1 needs to be stored, but it is much smaller than the cost of adding a full 1-D filter when a double-speed system requirement is needed.

Still referring to FIG. 10, each separate filter produces a 1-D IDTW filtered result, which can also be referred to as a filter output. A 2-D IDWT filtered result or output is achieved by performing the 1-D IDWT filtering twice. First the filtering is done in the vertical direction, which produces a 1-D vertical synthesis result. Second the filtering is done in the horizontal direction, which produces a 1-D horizontal result. The second result, i.e., the 1-D horizontal result, is the 2-D IDWT result. More explicitly, to do a 2-D IDWT on an 8×16 slice, first sixteen (16) 8×1 vertical 1-D IDWTs are performed, then eight (8) 1×16 horizontal IDWTs are performed. The output result of those latter eight (8) 1×16 horizontal IDWTs is the 2-D IDWT result of this 8×16 slice. If the overlapping IDWT operation of FIG. 10 is not used, then about 48 clock cycles (i.e., 16×2+8×2=48) are needed to complete (16+8)=24 1-D IDWTs, and the average throughput is 24/48=0.5 filter results per cycle. By contrast, if the overlapping IDWT operation of FIG. 10 is used, then only about 26 clock cycles (i.e., 16+1+8+1=26) are need to complete the 24 1-D IDWTs, and the average throughput is 24/26=0.923 filter results per cycle. This enables the saving of about 22 clock cycles (i.e., 48-26=22), which saves processing time, and hence can use fewer instances of the 1-D synthesis filters to achieve the same required processing power demand.

As was shown in and described above with reference to FIG. 2C, a large 3-band internal memory storage 240 was conventionally needed to support the real-time IDWT processes described above. Certain embodiments of the present invention, which are described below, reduce or completely eliminate this storage.

Figure 11A:
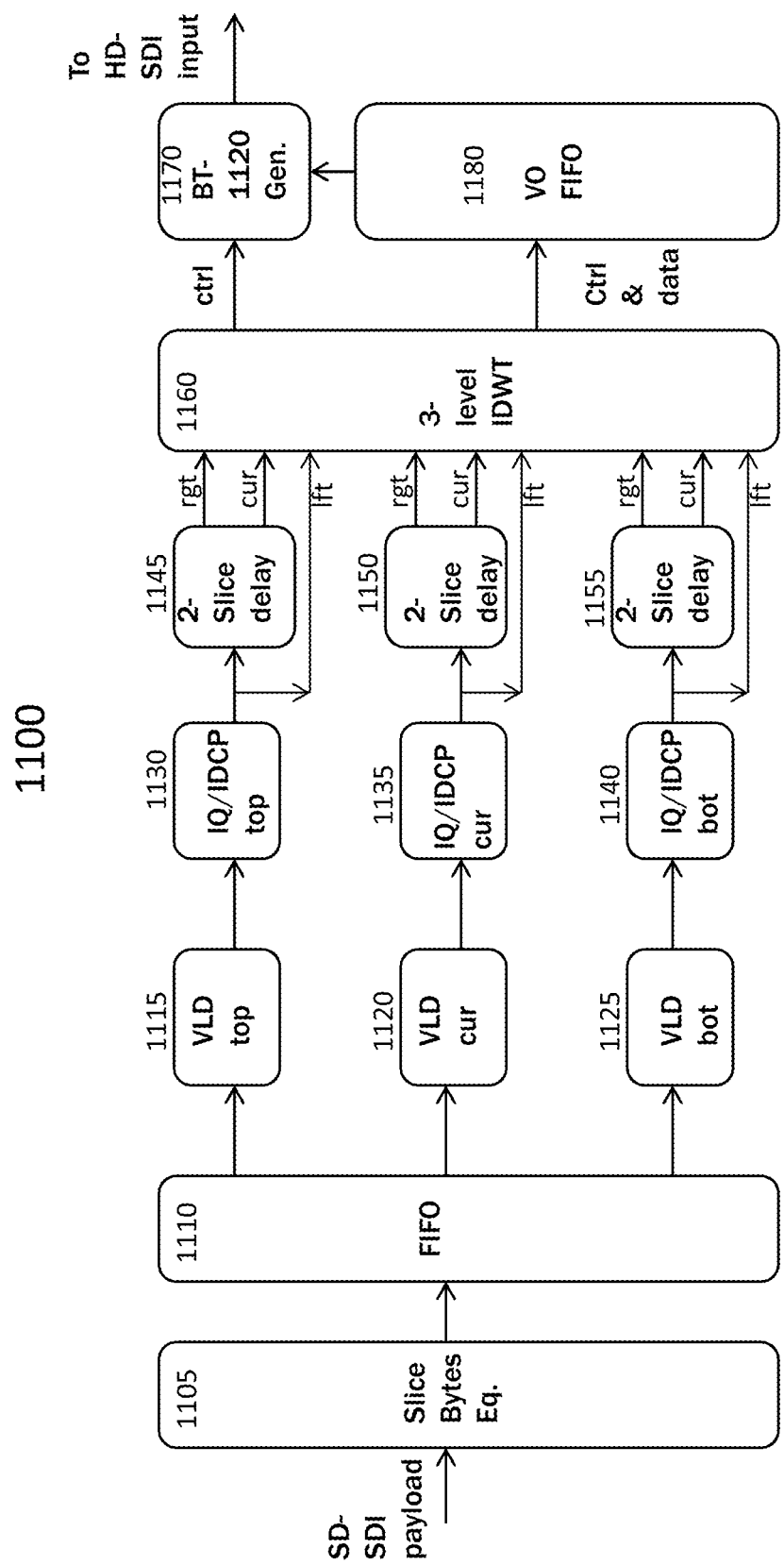
FIG. 11A shows a three-band parallel processing VLD-IQ/IDCP-IDWT VC-2 decoder architecture.

FIG. 11A shows a 3-band parallel processing VLD-IQ/IDCP-IDWT VC-2 decoder architecture 1100, according to an embodiment of the present invention. This 3-band parallel processing decoder architecture 1100 processes and generates the required 3-band IDWT input data in real-time, so that the above discussed 3-band internal memory 240 can be completely eliminated. This is achieved at the cost of two extra sets of VLD and IQ/IDCP modules 1115, 1125, 1130 and 1140. Due to the relative small amount of logic required to implement the VLD and IQ/IDCP modules, the extra hardware's gate count is less than 2% of the large gate count needed to implement the memory which they replace. The operation of the parallel architecture includes the use of three bands of processes running in parallel. The top-band VLD 1115, IQ/IDCP 1130, and 2-slice delay 1145 generates the top-three slices of IDWT input data in real-time. The left, current, and right slices' data are fed to the IDWT processor 1160 in real-time simultaneously as shown. The current-band VLD 1120, IQ/IDCP 1135, and 2-slice delay 1150 generates the current-three slices of IDWT input data in real-time. The left, current, and right slices' data are fed to the IDWT processor in real-time simultaneously as shown. The bottom-band VLD 1125, IQ/IDCP 1140, and 2-slice delay 1155 generates the bottom-three slices of IDWT input data in real-time. The left, current, and right slices' data are fed to the IDWT processor 1160 in real-time simultaneously as shown. The 2-slice delay 1155 can be implemented using as a buffer memory used to store the output data from the IQ/IDCP processes. The IDWT module 1160 receives the required 9-slice input data and decodes them to generate the output data suitable for display through the video output (VO)-FIFO 1180 and the BT-1120 generator 1170. Additional implementation details, according to specific embodiments of the present invention, are described below.

Figure 11B:
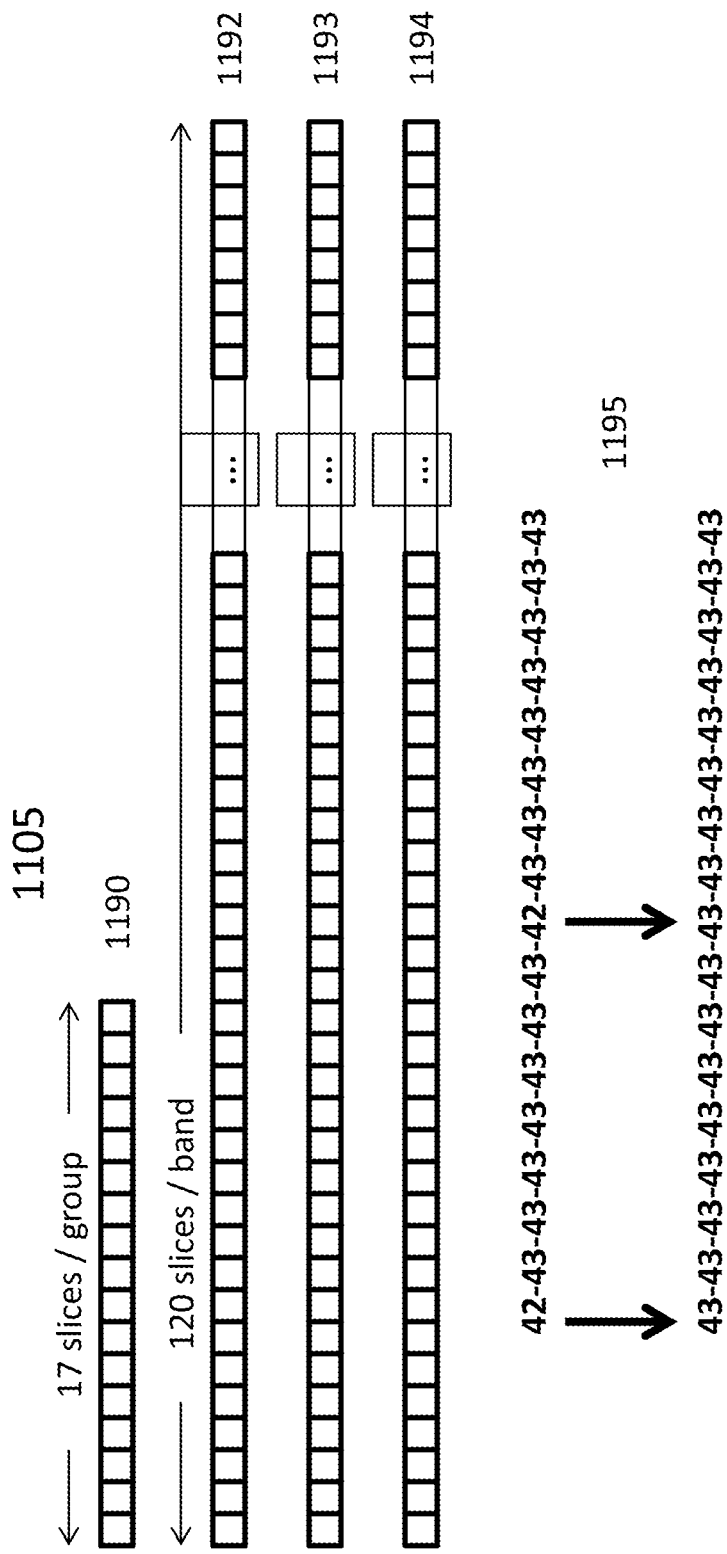
FIG. 11B shows a slice-bytes equalizer design to ease the input FIFO read addressing.

FIG. 11B illustrates a slice bytes equalizer design 1105 to ease the input FIFO read addressing. More specifically, FIG. 11B shows a first stage slice_bytes equalizer 1105 that equalizes the compressed data-length of each input slice. In VC-2, the interleaved exp-Golomb IEG encoding of each 8-line-by-16-pixel slice is constrained to an integer number of bytes called "slice_bytes". Due to the nature of variable-length encoding, the slice_bytes normally vary from one slice to the next. To ease synchronization of the decoder with the encoded bit-stream, a number of slices are grouped together so that the sequence of slice_bytes has a regular periodic pattern. For example, the slice_bytes group 1190 for a 1080129.97 system has a complicated periodic pattern with 17 elements "42, 43, 43, 43, 43, 43, 43, 43, 42, 43, 43, 43, 43, 43, 43, 43, 43". This means that the $1^{st}$ and the $9^{th}$ slices in the 17-slice group are encoded with 42 bytes, while all others are encoded in 43 bytes. Across a band 1192 in the HD picture there are 1920/16=120 slices per band. In the new parallel architecture, it is required to access three bands of variable-length data 1192, 1193, 1194 that are separated by 120 slices apart. Since 120 is not a simple multiple of 17, this makes the input data accessing difficult. To ease this problem, the slice-bytes equalizer 1105 takes advantage of the IEG property that the "1" bit decodes to the "zero" value which is ignored at the end of a slice. The equalizer thus inserts eight "1" bits to the end of a slice whenever a short-slice (in this embodiment, a 42-byte slice) is encountered in the input bit-stream, and makes all slice_bytes of equal length. In this specific embodiment, it is 43 bytes for each slice. After the equalization, each slice contains the same number of compressed data bytes, and so does each band. The equalized slice_bytes turns the variable-length compressed data into fixed-length compressed data, and allows read addresses for the top-band, the current-band, and the bottom-band, which are separated one-band apart from each other, to be calculated easily. The cost for this equalizer is about 0.27% more storage space in the input FIFO 1110 for this specific embodiment.

In FIG. 11A, the three VLD modules 1115, 1120, 1125 and the three IQ/IDCP modules 1130, 1135, 1140 decode simultaneously three neighboring bands to provide 3×1 slices input data, the right-column, for one third of the input data which the current-slice's IDWT requires. The three 2-slice delay modules 1145, 1150, and 1155 are used to store and provide the previous two thirds of data, the center-column and the left-column, in the 3×3 slices of data which the current-slice IDWT requires for decoding. This parallel architecture 1100 thus generates the required 3×3 slice data for decoding any slice in the picture, and totally eliminates the 3-band internal memory (e.g., 240 in FIG. 2A) that is required for a conventional one-band processing.

Figure 12A:
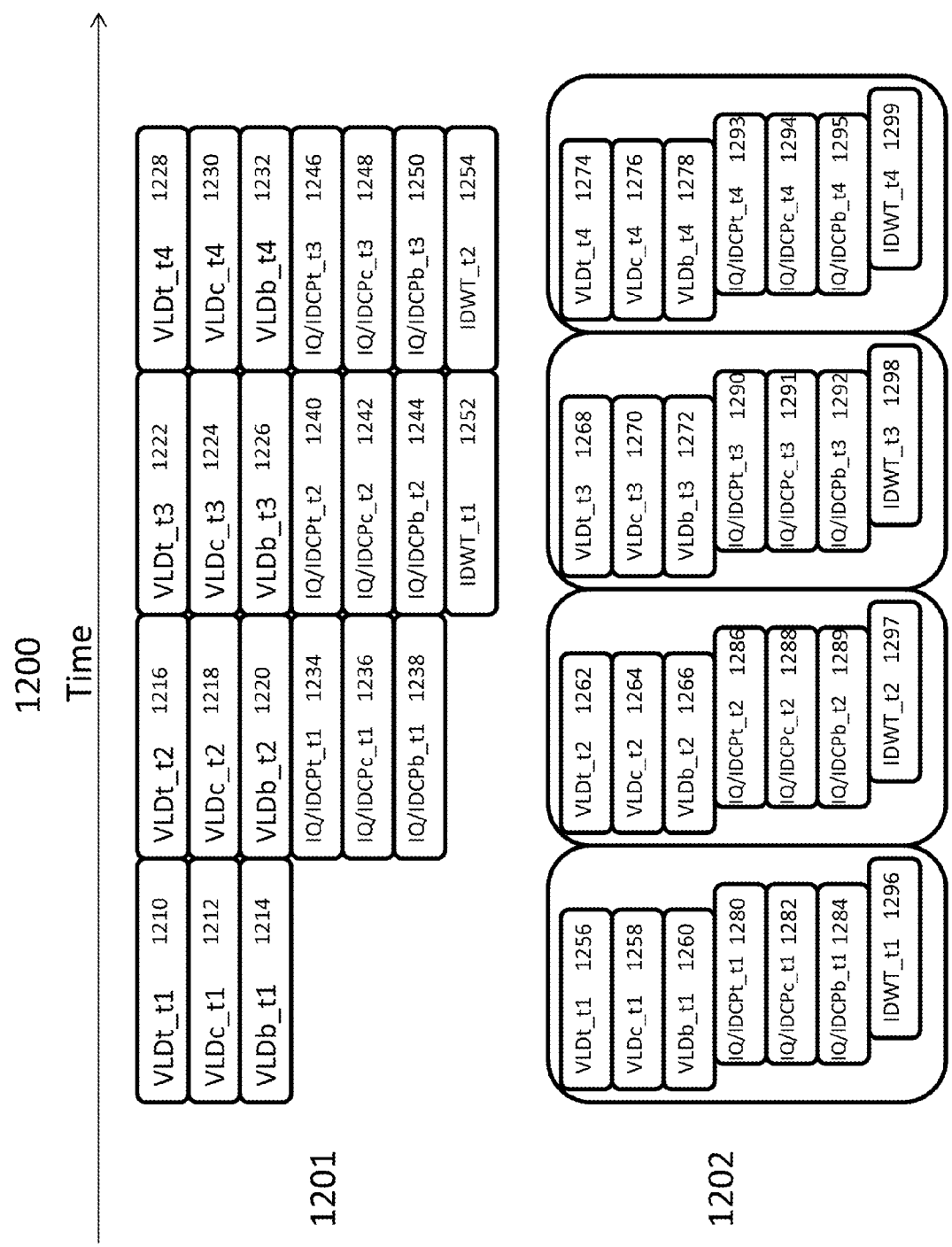
FIG. 12A shows the four processes (VLD-IQ/IDCP-IDWT) in one time slot architecture used to save at least 50% of inter-process interface registers.

FIG. 12A is used to explain the time dependency of an efficient four-processes-in-one-time-slot scheme 1200, according to specific embodiments, that is used to reduce the quantity of inter-process interface registers (used to store results of each of four processes associated with each of the three parallel data-paths) by about at least 50%. More specifically, the portion of FIG. 12A labeled 1202 illustrates the four-processes-in-one-time-slot (VLD, IQ, IDCP and IDWT processes) scheme that can be used to save at least 50% of the inter-process interface registers within a VC-2 decoder. For comparison, a conventional decoder design 1201 is also shown, which uses a conventional 3-stage pipelining design to relieve the speed requirement for each functional module. Beneficially, when using the four-processes-in-one-time-slot scheme 1202, since all intermediate data between the four processes are fully utilized within each one-slice process time, there is no need to store extra copies of these intermediate results for later usage by the next-stage process, thereby enabling the elimination of 50% of the inter-process registers. A cost for the scheme 1202 is that the processing speed for the four processes needs to be almost doubled. However, since random logic is much smaller than a large bank of registers, overall hardware costs are reduced compared to the conventional scheme 1201.

Figure 12B:
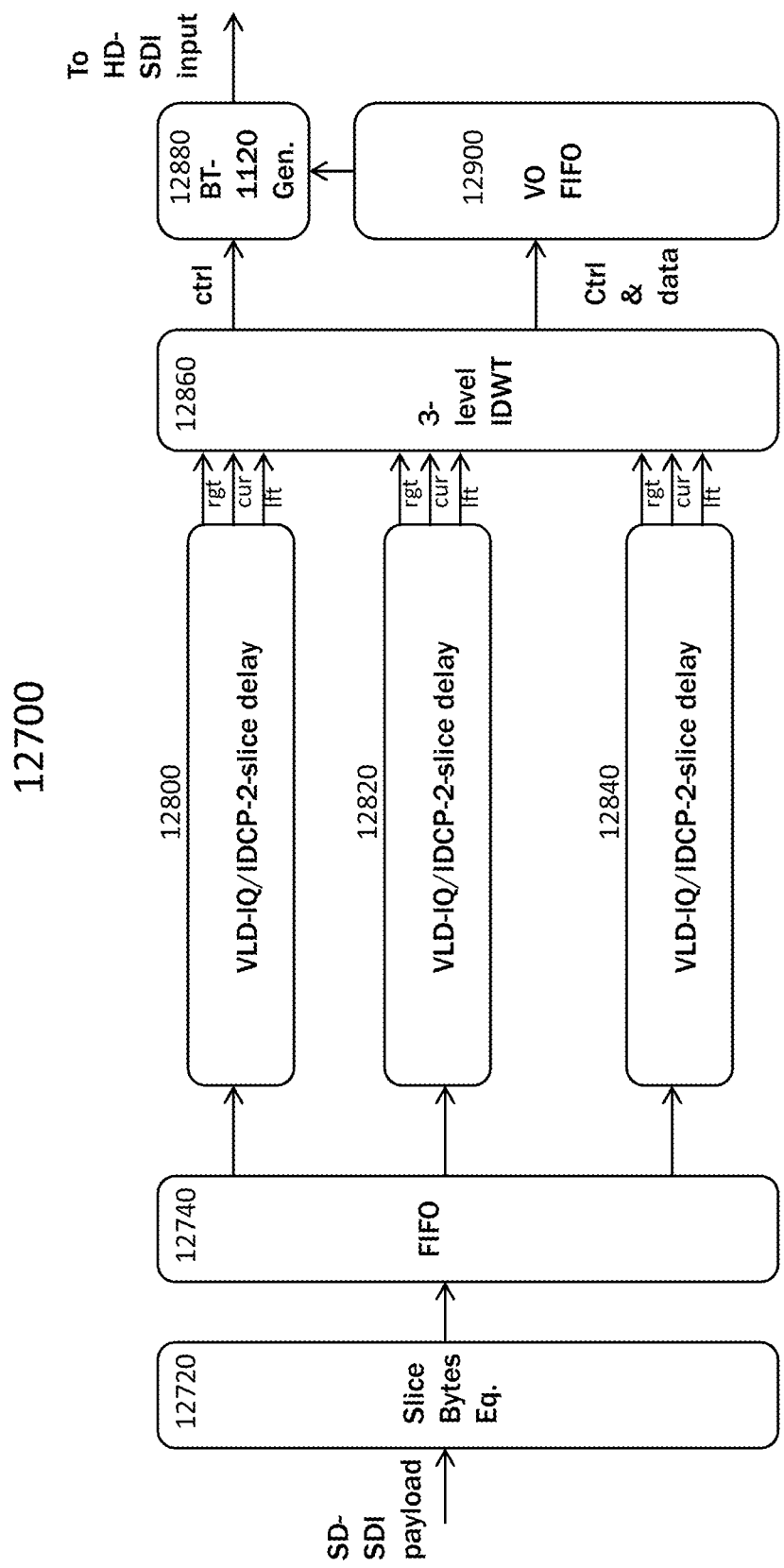
FIG. 12B shows the three-band parallel processing architecture using the four processes in one time-slot method.

In FIGS. 11A and 12A, it is assumed that IQ and IDCP processing are collectively performed. Accordingly, there are essentially three major processes, i.e., VLD, IQ/IDCP and 3-level IDWT. By separating the three major processes into three separate processing time slots, each process can have a full-slot's time to finish processing one slice, so the processing speed requirement is relaxed. In accordance with specific embodiments of the present invention, there is a separate instance of the 1202 four-processes-in-one-time-slot scheme architecture (shown in FIG. 12A) for each of the three parallel data-band paths shown in FIG. 12B (and, also shown in FIG. 11A). In other words, there is a four-processes-in-one-time-slot scheme 1202, marked by VLDt and IQ/IDCPt, where "t" represents the top-band, corresponding to the top-band data path 12800; a four-processes-in-one-time-slot scheme 1202, marked by VLDc and IQ/IDCPc, where "c" represents the current-band, corresponding to the current-band data path 12820; and a four-processes-in-one-time-slot scheme 1202, marked by VLDb and IQ/IDCPb, where "b" represents the bottom-band, corresponding to the bottom-band data path 12840. More generally, FIGS. 12A and 12B illustrate, respectively, how specific embodiments of the present invention take advantage of the time-dependency and the geometric dependency associated with processing the top-band, the current-band and the bottom band. Further, it is noted that each of the aforementioned data paths can alternatively be referred to as a decoder path, since such data paths are within the VC-2 decoder.

In the VC-2 decoder design, one potential problem associated with processing three separate data-bands is that a large number of internal inter-process registers may be needed. For example, in order to process a current data slice, while leaving the previous-slice's result for the next process to use, each functional module may need to keep two sets of registers operating in a ping-pong fashion, which would result in (4×2×128×14×3) 43,008 registers being used, which is quite large. To save this large amount of inter-module communication registers, the four-processes-in-one-time-slot 1202 is used. Based on a special VC-2 property that the lower-band data and higher-band data are processed sequentially, it is not necessary to wait for all high-band data from VLD to be available to start processing the next IQ/IDCP pipe. Only a tiny 1/16-th portion of it, the low-low band, needs to be finished before the next process can start its pipe. Then, after the remaining 3/16-th, and finally the last 3/4-th high bands are done, the corresponding IQ/IDCP and IDWT process can start. Based on this overlapped start schedule method, the IDWT process gets more than half of its original budget using this parallel pipeline architecture 1202. To achieve the required double-speed for IDWT, two small 1-D IDWT processes can run in parallel to achieve the speed target.

FIG. 12B, which as mentioned above is a redrawn version of FIG. 11A, shows a VC-2 decoder 12700 with parallel VLD-IQ/IDCP modules with the 2-slice delays in the three-band architecture. Referring to FIG. 12B, the decoder 12700 includes a slice bytes equalizer 12720, a FIFO 12740, parallel data paths 12800, 12820 and 12840, a 3-level IDWT module 12860, a BT-1120 generator 12880, and a VO FIFO 12900. The data path 12800 generates the top-band real-time data for the top-right-slice. With the 2-slice delay, it sends the required top-band 3-slice data to the 3-level IDWT process as described in FIG. 4 to FIG. 9. The data path 12820 generates the current-band real-time data for the current-right-slice. With the 2-slice delay, it sends the required current-band 3-slice data to the 3-level IDWT process as described in FIG. 4 to FIG. 9. The data path 12840 generates the bottom-band real-time data for the lower-right-slice. With the 2-slice delay, it sends the required bottom-band 3-slice data to the 3-level IDWT process as described in FIG. 4 to FIG. 9. In accordance with certain embodiments, the direct real-time data delivery is done without using any internal memory buffers, which is an advantage of such embodiments.

More generally, FIG. 12B illustrates three parallel data paths including a top-band data path 12800, a current-band data path 12820, and a bottom-band data path 12840. The top-band data path 12800 performs variable length decoding (VLD), inverse-quantization (IQ) and inverse-DC-prediction (IDCP) processing of a top compressed data-band. The current-band data path 12820 performs VLD, IQ and IDCP processing of a current compressed data-band. The bottom-band data path 12840 performs VLD, IQ and IDCP processing of a bottom compressed data-band. FIG. 12B also shows a three-level inverse discrete wavelet transform (IDWT) module 12860 to perform IDWT processing to synthesize decoded pixel values in dependence on partially-decompressed top, current and bottom data-bands produced using the three parallel data paths. Each of the three parallel data paths 12800, 12820 and 12840 also performs a 2-slice delay that is used to separate its respective partially-decompressed data-band, resulting from the VLD, IQ and IDCP processing, into left, current, and right data-slices that are provided to the three-level IDWT module 12860. The VO-FIFO 12900, which can also be referred to as a scan conversion FIFO, converts a slice-based output of the three-level IDWT module 12860 to a line-scan-based video output that is provided to the BT-1220 generator 12880. The BT-1220 generator 12880 inserts horizontal and vertical blanking periods into data received from the scan conversion FIFO 12900 to thereby output a video signal having the BT-1220 format.

FIG. 12B also shows a slice bytes equalizer 12720 which is equivalent to the slice bytes equalizer 1105 in FIG. 11A, and a bit-stream FIFO 12740 which is equivalent to the FIFO 1110 in FIG. 11A. The slice-bytes equalizer 12720 is used to equalize a number of bytes-per-data-slice in each slice, and hence each of three compressed data-bands including the top compressed data-band, the current compressed data-band and the bottom compressed data-band before said data-bands are provided to the three parallel data paths. The bit-stream FIFO 12740 is used to buffer compressed data received from the slice-bytes equalizer 12720 to accommodate real-time processing of an input video format provided to an input of the bit-stream FIFO 12740 and an output video format output at an output of the decoder 12700. In accordance with specific embodiments, Equations (1) and (2) discussed above are used to determine the size of the bit-stream FIFO 12740, and thus, the size of the bit-stream FIFO 12740 is dependent on a difference in active-region duty-cycles between the input and output video formats, as well as a total active-picture size of said input video format. This enables the bit-stream FIFO 12740 to provide seamless and non-breaking display operation of the output video format.

Still referring to FIG. 12B, in accordance with specific embodiments, the three-level IDWT module 12860 includes a pipelined two-dimensional (2-D) IDWT synthesis filter that is implemented using N overlapped one-dimensional (1-D) IDWT filters, wherein N is a number of 1-D IDWT filters that are executed consecutively to generate a 2-D IDWT result, as was explained above with reference to FIG. 10. Use of the N overlapped 1-D IDWT filters achieves an average throughput of N/(1+N) 1-D IDWT filter results per clock cycle, as was also described above with reference to FIG. 10.

FIG. 13A is used to show a further technique 1300 used to reduce the required 3×3 slices of registers. More specifically, FIG. 13A is used to illustrate a 9-slice storage reduction technique 1300 used to save 63.3% of IDWT-process data buffer registers. This technique is based on the VC-2 property that not all pixels in the 3×3 neighborhood-block are used to evaluate the current slice. Note that in FIG. 11A, the combined VLD/IQ/IDCP module 1130 contains the upper-right slice, 1135 contains the middle-right, and 1140 contains the lower-right slice. The 2-slice delay module 1145 contains the upper-center and upper-left slices. The 2-slice delay module 1150 contains the current-center and current-left slices. The 2-slice delay module 1155 contains the lower-center and lower-left slices.

FIG. 13B shows the 9-slice data-block dependency chart 1395 for processing all 3 levels of IDWT. For example, to process level-1 (L1), only one pixel is needed from the upper-right slice-0. Similarly L2 needs only one pixel and L3 also needs only one pixel. All together there is only a need to store 3 pixels in the upper-right slice, as versus a fully-populated 128 pixels in the slice-0 storage 1330. Based on this chart 1395, it is shown that the upper-center-slice-1 1320 needs only 28 registers, the upper-left-slice-2, 1310, needs only 28 registers; the current-right-slice-3, 1360, needs only 14 registers; the current-center-slice-4, 1350, needs the full 128 pixels; the current-left-slice-5, 1340, also needs the full 128 pixels; the lower-right-slice-6, 1390, needs only 6 pixels, the lower-center-slice-7, 1380, only needs 44 pixels, and the lower-left-slice-8, 1370, needs only 44 pixels. A specific addressing scheme is designed such that the required specific data are delivered to each level of the IDWT process in real-time.

In this embodiment, there is a reduction of the 9-slice data-block to a mere 3.3-slice block in terms of storage count. Compared to a conventional approach that fully populates (4×2×9×128×14) or 129,024 registers, this approach uses only (4×2×423×14) or 47,376 registers. The advantage is a saving of 63.3% of registers.

Figure 14:
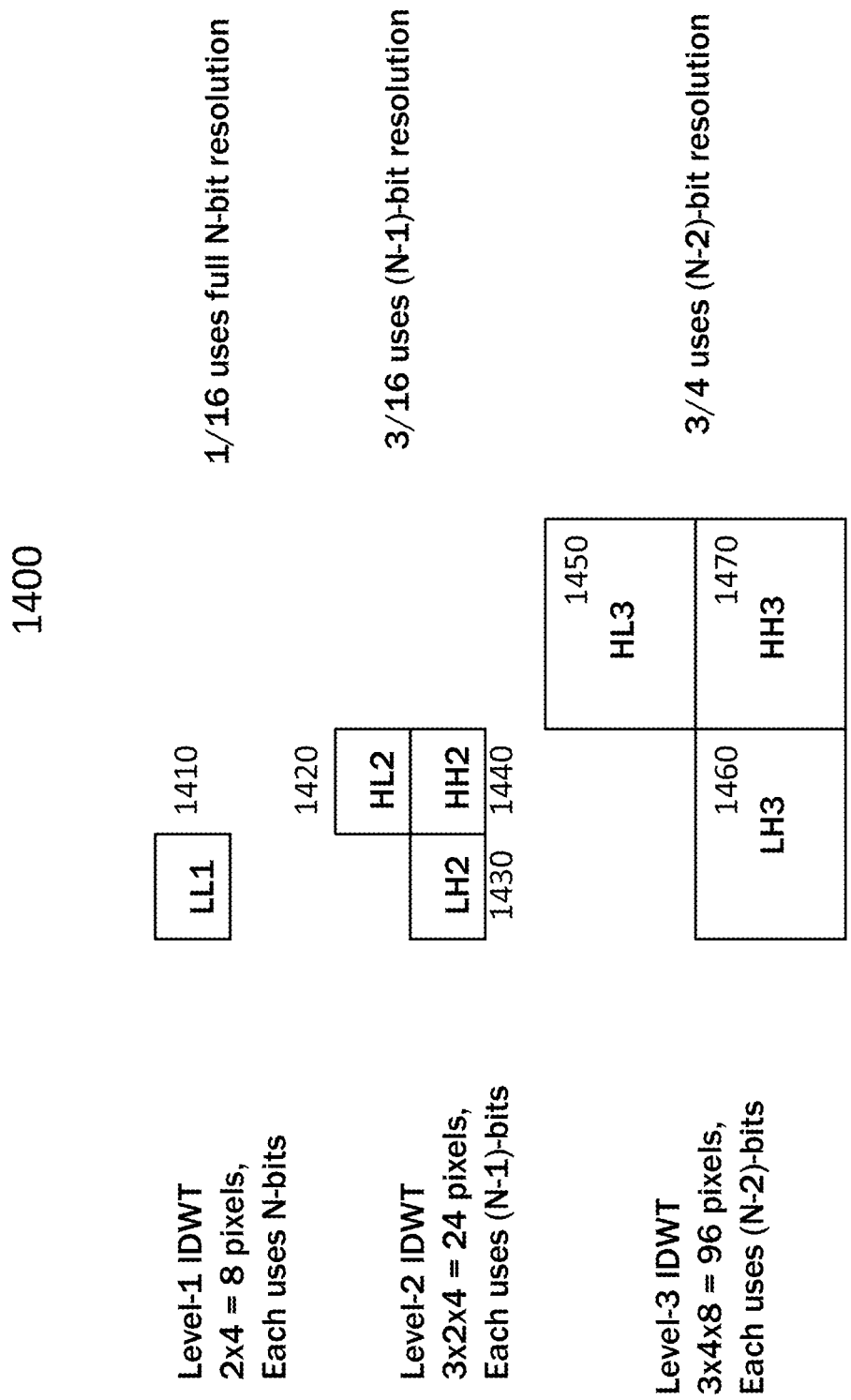
FIG. 14 shows the IDWT resolution-reduction method used to save over 10.5% of IDWT-process data buffer registers.

FIG. 14 is used to show an IDWT resolution-reduction technique 1400 used to squeeze out the last redundancy in the IDWT implementation. More specifically, FIG. 14 is used to show the IDWT resolution-reduction method 1400, used to save over 10.5% of IDWT-process data buffer registers. This technique is based on the VC-2 property that only one quantization index (qindex) is used for the entire slice that is analyzed into ten bands by the encoder's DWT process. In order to emphasize the lower-bands and de-emphasize the higher-bands using only one qindex, VC-2 applies a factor-2 up-scaling after each level of DWT on the encoder side. On the decoder side, there is an inverse down-scaling of 2 from L1 to L2, and again from L2 to L3. This means that the resolution needed to calculate L2-IDWT in 1420, 1430, 1440, is one-fewer bit than the resolution needed to calculate L1-IDWT 1410, and the resolution needed to calculate L3-IDWT in 1450, 1460, 1470, is also one-fewer bit than L2-IDWT. Since L3 contains 75% of pixels, or 96 out of 128 pixels, and L2 contains 18.75%, or 24 out of 128 pixels, a majority of the remaining slice storage registers can use 2-fewer bits or 1-fewer bit. This saves another 10.5% of the total remaining registers in the said embodiment. It also reduces the level-2 and level-3 arithmetic data-depth by the same number of bits, and hence renders a slightly faster IDWT processing speed. According, the three-level IDWT module (labeled 1160 in FIG. 11A, and labeled 12860 in FIG. 11B) can be configured to process one-fewer bit when performing the level-2 IDWT process than when performing the level-1 IDWT process, and process two-fewer bits when performing the level-3 IDWT process than when performing the level-1 IDWT process, which enables approximately 10% fewer inter-process interface registers and the same lower-resolution and slightly-faster arithmetic logics to be used than would be required if the three-level IDWT module processed a same number of bits when performing each of the level 1 IDWT process, the level 2 IDTW process and the level-3 IDWT process.

The various modules and blocks described above can be implemented using hardware, firmware, software and/or combinations thereof, as would be appreciated by one of ordinary skill in the art reading this disclosure. Such hardware can be implemented, e.g., using one or more processors, field-programmable gate arrays (FPGAs) and/or application specific integrated circuits (ASICs), but are not limited thereto.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present invention be limited only by the claims and the equivalents thereof.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed:

1. A decoder comprising:
   three parallel data paths including a top-band data path, a current-band data path, and a bottom-band data path,
      the top-band data path configured to perform variable length decoding (VLD), inverse-quantization (IQ) and inverse-DC-prediction (IDCP) processing of the top compressed data-band;
      the current-band data path configured to perform VLD, IQ and IDCP processing of the current compressed data-band; and
      the bottom-band data path configured to perform VLD, IQ and IDCP processing of the bottom compressed data-band; and
   a three-level inverse discrete wavelet transform (IDWT) module configured to perform IDWT processing to synthesize decoded pixel values in dependence on partially-decompressed top, current and bottom data-bands produced using the three parallel data paths;

wherein the three-level IDWT module includes a pipelined two-dimensional (2-D) IDWT synthesis filter that is implemented using N overlapped one-dimensional (1-D) IDWT filters, wherein N is a number of 1-D IDWT filters that are executed consecutively to generate a 2-D IDWT result.

2. The decoder of claim 1, further comprising:
a slice-bytes equalizer configured to equalize a number of compressed bytes in each data-slice being decoded by the decoder, and thereby, equalize a number of compressed bytes in each of three compressed data-bands including the top compressed data-band, the current compressed data-band and the bottom compressed data-band before said data-bands are provided to the three parallel data paths.

3. The decoder of claim 2, further comprising:
a bit-stream first-in-first-out (FIFO) configured to buffer compressed data received from the slice-bytes equalizer, wherein the compressed data received by the bit-stream FIFO is used to generate the top compressed data-band, the current compressed data-band and the bottom compressed data-band;
wherein the bit-stream FIFO accommodates real-time processing of an input video format provided to an input of the bit-stream FIFO and an output video format output at an output of the decoder, said output video format being different than said input video format; and
wherein a size of the bit-stream FIFO is dependent on a difference in active-region duty-cycles between said input and output video formats, as well as a total active-picture size of said input video format; and
wherein the bit-stream FIFO having said size enables a seamless and non-breaking display operation of the output video format.

4. The decoder of claim 1, wherein each of the three parallel data paths is also configured to perform a 2-slice delay that is used to separate a said partially-decompressed data-band, resulting from the VLD, IQ and IDCP processing, into left, current, and right data-slices that are provided to the three-level IDWT module.

5. The decoder of claim 1, further comprising a scan conversion FIFO configured to convert a slice-based output of the three-level IDWT module to a line-scan-based video output.

6. The decoder of claim 5, further comprising a module configured to insert horizontal and vertical blanking periods into data received from the scan conversion FIFO to thereby output a video signal having a specified format.

7. The decoder of claim 1, wherein the three-level IDWT module includes a pipelined two-dimensional (2-D) IDWT synthesis filter that is implemented using N overlapped one-dimensional (1-D) IDWT filters, wherein N is a number of 1-D IDWT filters that are executed consecutively to generate a 2-D IDWT result.

8. The decoder of claim 1, wherein use of the N overlapped 1-D IDWT filters achieves an average throughput of N/(1+N) 1-D IDWT filter results per clock cycle.

9. The decoder of claim 1, wherein:
inter-process interface registers are used to store results of each of four processes associated with each of the three parallel data-paths, the four processes including the VLD, the 10, the IDCP and the three-level IDWT processes; and
use of a four-processes-in-one-time-slot scheme enables at least 50% fewer said inter-process interface registers to be used than would be required if the four processes were performed in four separate time slots in a pipelined operation.

10. The decoder of claim 1, wherein:
inter-process interface registers are used to store results of each of four processes associated with each of the three parallel data-paths, the four processes including the VLD, the IQ, the IDCP and the three-level IDWT processes; and
use of the three parallel data paths and of data dependencies that exist between different slices of each 3×3-data-slice-unit enables less than one-half of each 3×3-data-slice-unit to be stored within the inter-process interface registers at any point in time.

11. The decoder of claim 1, wherein:
inter-process interface registers are used to store results of each of a level-1 IDWT process, a level-2 IDWT process and a level-3 IDWT process performed by the three-level IDTW module; and
the three-level IDWT module is configured to process one-fewer bit when performing the level-2 IDWT process than when performing the level-1 IDWT process, and process two-fewer bits when performing the level-3 IDWT process than when performing the level-1 IDWT process, which enables approximately 10% fewer inter-process interface registers to be used than would be required if the three-level IDWT module processed a same number of bits when performing each of the level 1 IDWT process, the level 2 IDTW process and the level-3 IDWT process.

12. A method for use when decoding data comprising:
(a) performing variable length decoding (VLD), inverse-quantization (IQ) and inverse-DC-prediction (IDCP) processing of a top compressed data-band;
(b) performing VLD, IQ and IDCP processing of a current compressed data-band; and
(c) performing VLD, IQ and IDCP processing of a bottom compressed data-band;
wherein steps (a), (b) and (c) are performed in parallel; and further comprising
(d) performing three-level inverse discrete wavelet transform (IDWT) processing to synthesize decoded pixel values in dependence on partially-decompressed top, current and bottom data-bands resulting from steps (a), (b) and (c);
wherein each of steps (a), (b) and (c) further comprises performing a 2-slice delay that is used to separate a partially-decompressed data-band, resulting from the VLD, IQ and IDCP processing, into left, current, and right data-slices that are used for performing the three-level IDWT processing at step (d).

13. The method of claim 12, further comprising:
equalizing a number of bytes per data-slice in each of three compressed data-bands including the top compressed data-band, the current compressed data-band and the bottom compressed data-band before said processing of said data-bands are performed in parallel at steps (a), (b) and (c).

14. The method of claim 12, further comprising:
(e) converting a slice-based result of step (d) to a line-scan-based video output.

15. The method of claim 14, further comprising:
(f) inserting horizontal and vertical blanking periods into data resulting from the converting performed at step (e) to thereby produce a video signal having a specified format.

16. The method of claim 12, wherein performing steps (a), (b) and (c) in parallel and using data dependencies that exist between different slices of each 3×3-data-slice-unit enables less than one-half of each 3×3-data-slice-unit to be stored at any point in time when performing steps (a), (b) and (c).

17. The method of claim 12, wherein:
the three-level IDWT processing performed at step (d) includes a level-1 IDWT process, a level-2 IDWT process and a level-3 IDWT process; and
when performing the three-level IDWT processing at step (d), processing one-fewer bit when performing the level-2 IDWT process than when performing the level-1 IDWT process, and processing two-fewer bits when performing the level-3 IDWT process than when performing the level-1 IDWT process.

18. A method for use when decoding data comprising:
(a) performing variable length decoding (VLD), inverse-quantization (IQ) and inverse-DC-prediction (IDCP) processing of a top compressed data-band;
(b) performing VLD, IQ and IDCP processing of a current compressed data-band; and
(c) performing VLD, IQ and IDCP processing of a bottom compressed data-band;
wherein steps (a), (b) and (c) are performed in parallel; and further comprising
(d) performing three-level inverse discrete wavelet transform (IDWT) processing to synthesize decoded pixel values in dependence on partially-decompressed top, current and bottom data-bands resulting from steps (a), (b) and (c);
wherein the three-level IDWT processing performed at step (d) is implemented using N overlapping one-dimensional (1-D) IDWT filters, wherein N is a number of 1-D IDWT filters that are executed consecutively to generate a 2-D IDWT result.

19. The method of claim 18, wherein use of the N overlapping 1-D IDWT filters achieves an average throughput of N/(1+N) 1-D IDWT filter results per clock cycle.

20. The method of claim 18, further comprising:
storing, in inter-process interface registers, results of each of four processes including the VLD, the IQ, the IDCP and the three-level IDWT processes; and
using of a four-processes-in-one-time-slot scheme to reduce by at least 50% a quantity of inter-process interface registers that would be required if the four processes were performed in four separate time slots.

21. A decoder comprising:
a slice-bytes equalizer configured to equalize a number of compressed bytes in each data-slice being decoded by the decoder, and thereby, equalize a number of compressed bytes in each of three compressed data-bands including a top compressed data-band, a current compressed data-band and a bottom compressed data-band;
three parallel data paths including a top-band data path, a current-band data path, and a bottom-band data path,
the top-band data path configured to perform variable length decoding (VLD), inverse-quantization (IQ) and inverse-DC-prediction (IDCP) processing of the top compressed data-band;
the current-band data path configured to perform VLD, IQ and IDCP processing of the current compressed data-band; and
the bottom-band data path configured to perform VLD, IQ and IDCP processing of the bottom compressed data-band; and
a three-level inverse discrete wavelet transform (IDWT) module configured to perform IDWT processing of partially-decompressed top, current and bottom data-bands produced using the three parallel data paths;
wherein the three-level IDWT module includes a pipelined two-dimensional (2-D) IDWT synthesis filter that is implemented using a plurality of overlapped one-dimensional (1-D) IDWT filters.

* * * * *